United States Patent [19]
Nakama et al.

[11] Patent Number: 5,867,321
[45] Date of Patent: Feb. 2, 1999

[54] PLANAR MICROLENS ARRAY AND METHOD OF MAKING SAME

[75] Inventors: Kenichi Nakama; Satoshi Taniguchi; Kenjiro Hamanaka; Hiroshi Hamada, all of Osaka, Japan

[73] Assignee: Nippon Sheet Glass Co., Ltd., Osaka, Japan

[21] Appl. No.: 700,397

[22] PCT Filed: Dec. 26, 1995

[86] PCT No.: PCT/JP95/02681

§ 371 Date: Dec. 13, 1996

§ 102(e) Date: Dec. 13, 1996

[87] PCT Pub. No.: WO96/21169

PCT Pub. Date: Jul. 11, 1996

[30] Foreign Application Priority Data

Dec. 29, 1994 [JP] Japan .................................. 6-339234
Jun. 30, 1995 [JP] Japan .................................. 7-165148

[51] Int. Cl.⁶ .................................................. G02B 27/10
[52] U.S. Cl. ........................... 359/619; 359/620; 359/900
[58] Field of Search .................................. 359/619, 620, 359/628, 900; 349/95, 5

[56] References Cited

U.S. PATENT DOCUMENTS

| | | | |
|---|---|---|---|
| 4,332,438 | 6/1982 | Green | 359/628 |
| 4,695,719 | 9/1987 | Wilwerding | 251/216 |
| 5,337,186 | 8/1994 | Oikawa et al. | 359/628 |
| 5,359,440 | 10/1994 | Hamada et al. | 359/41 |
| 5,381,187 | 1/1995 | Takamatsu et al. | 348/759 |
| 5,519,539 | 5/1996 | Hoopman et al. | 359/741 |
| 5,581,379 | 12/1996 | Aoyama et al. | 349/5 |
| 5,715,022 | 2/1998 | Takamatsu et al. | 348/759 |

FOREIGN PATENT DOCUMENTS

| | | | |
|---|---|---|---|
| 0 517 500 | 12/1992 | European Pat. Off. . | |
| 1-211701 | 8/1989 | Japan | 359/628 |
| 3-136004 | 6/1991 | Japan . | |
| 5-45642 | 2/1993 | Japan . | |
| 6-075105 A | 3/1994 | Japan . | |
| 6-230203 | 8/1994 | Japan . | |

OTHER PUBLICATIONS

European Patent Office Search Report, Apr. 7, 1997.

*Primary Examiner*—Georgia Y. Epps
*Assistant Examiner*—Ricky Mack
*Attorney, Agent, or Firm*—Ratner & Prestia

[57] ABSTRACT

A microlens array of high converging efficiency is provided, independently of the array and lens filling rate of microlens arrays, with a method of manufacturing microlens arrays using the diffusion process. A multitude of refractive-index distribution type microlenses formed by diffusing in a planar transparent substrate a substance contributing to increasing the refractive index of the substrate are two-dimensionally and regularly arranged on the surface of the substrate. The microlenses are densely arranged on the surface of the substrate, and diffusion fronts of the microlenses form regions where the diffusion fronts are fused with those of the adjoining microlenses. The length of a region where certain two adjoining microlenses are fused together, in the direction of a straight line connecting the centers of the two microlenses is less than 20% of the array pitch of the microlenses in the above-mentioned direction.

18 Claims, 22 Drawing Sheets

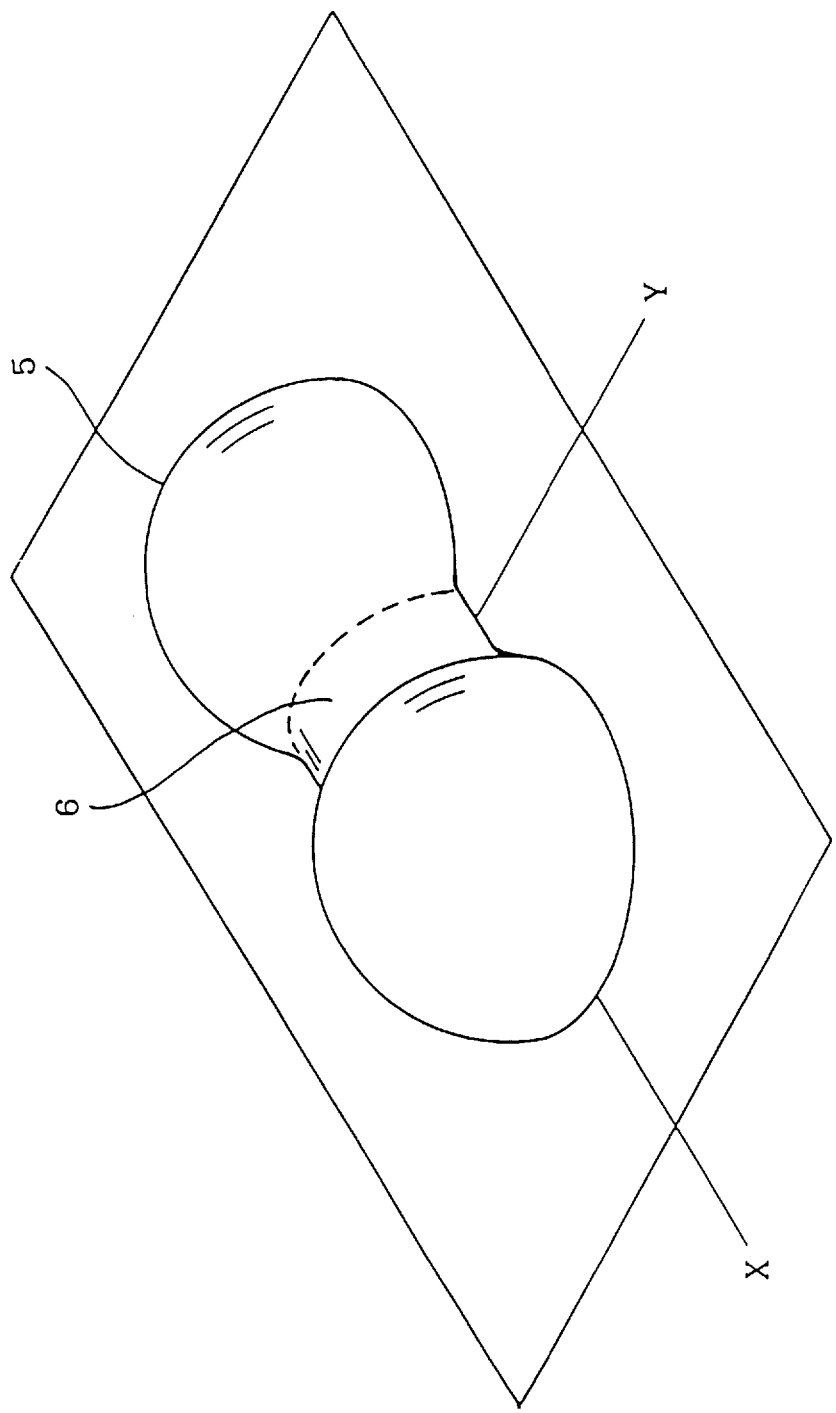

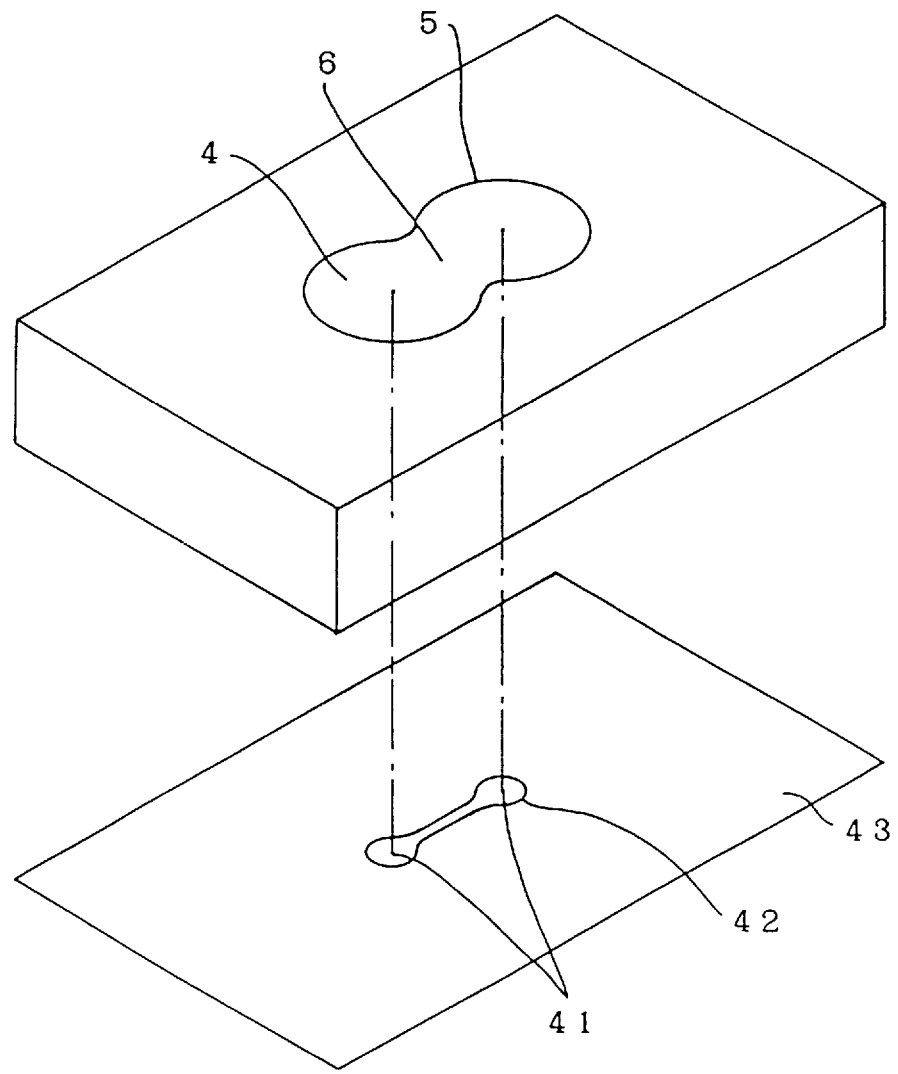
F I G. 8

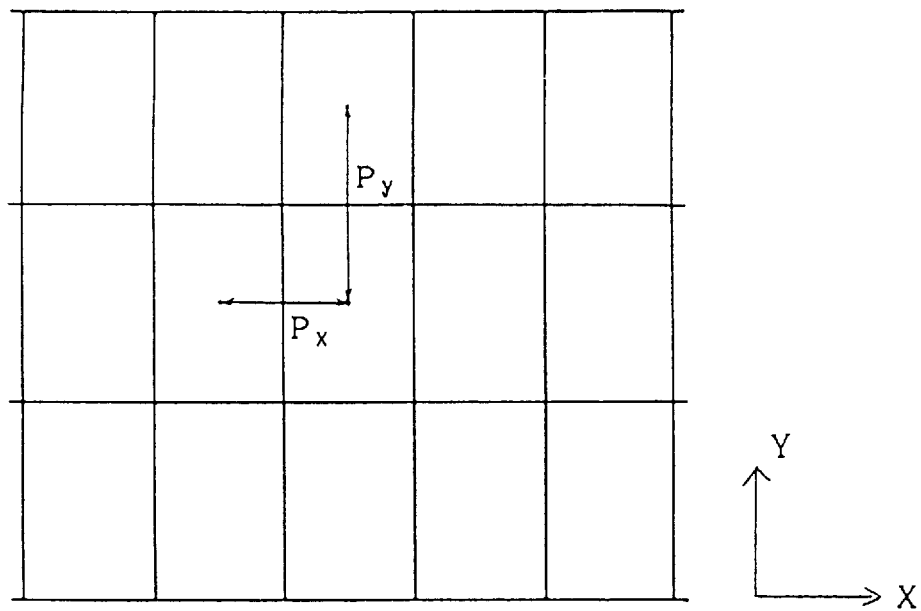
F I G. 9A
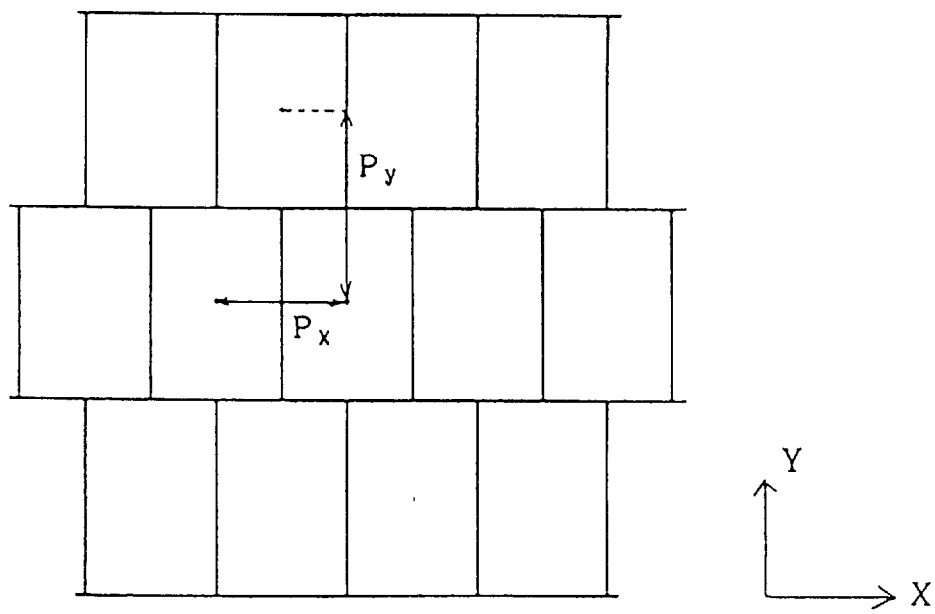
F I G. 9B

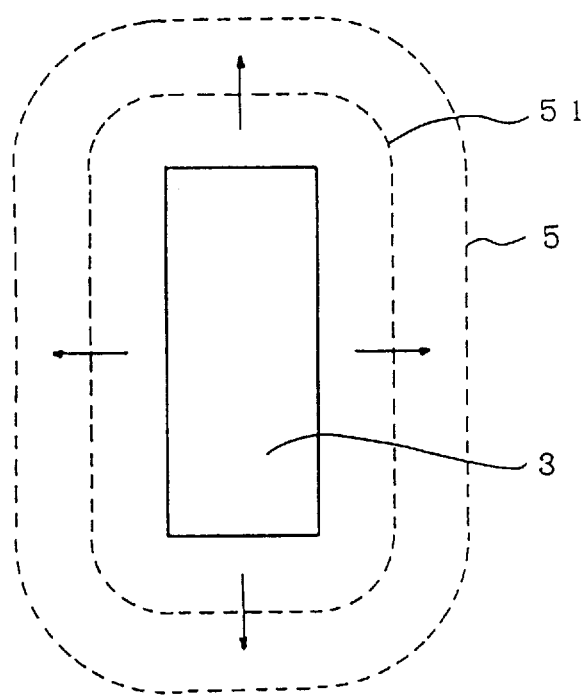
F I G. 1 0

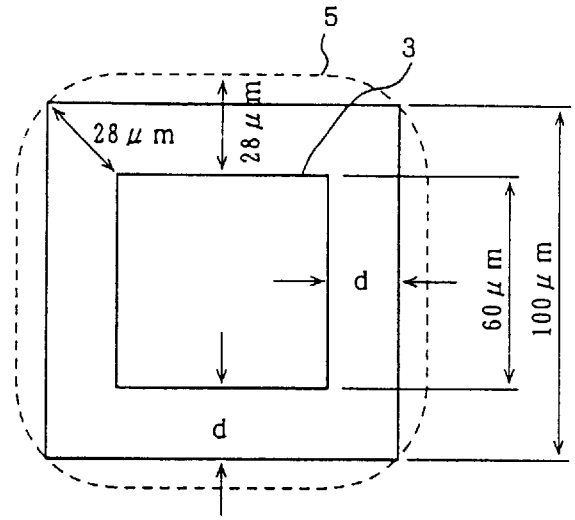
F I G. 1 1 A
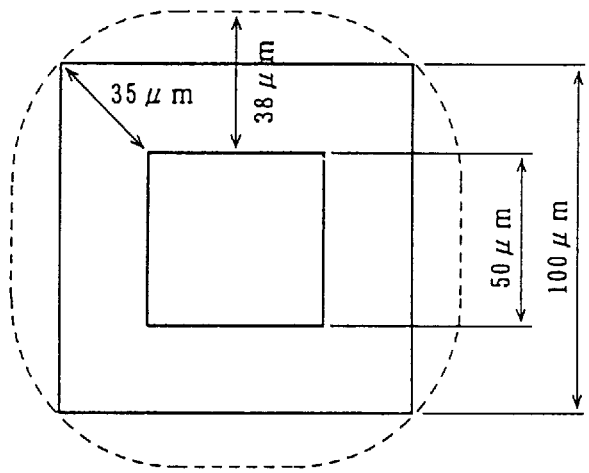
F I G. 1 1 B
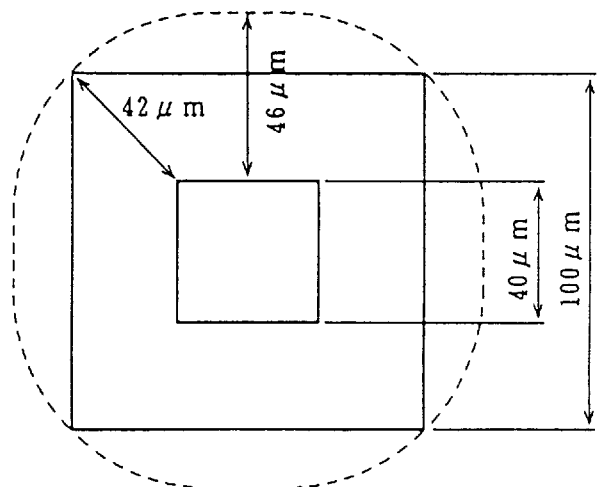
F I G. 1 1 C

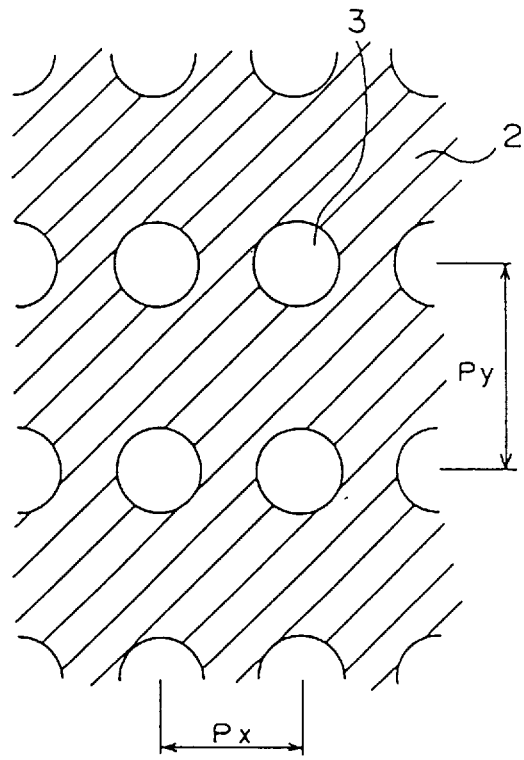
F I G. 1 2 A
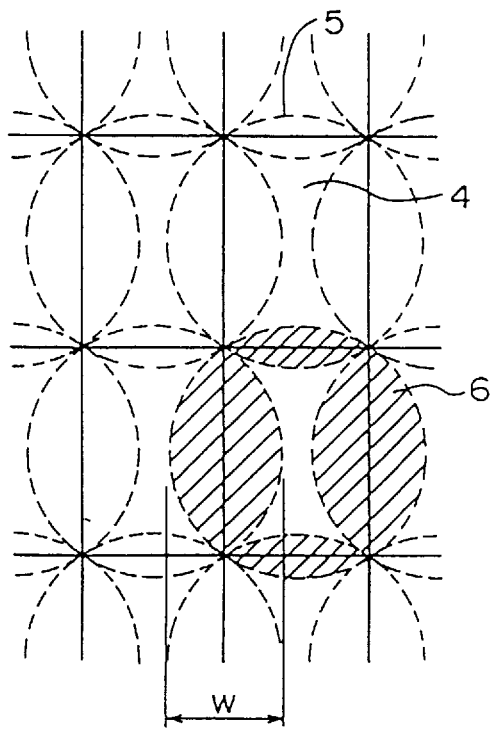
F I G. 1 2 B

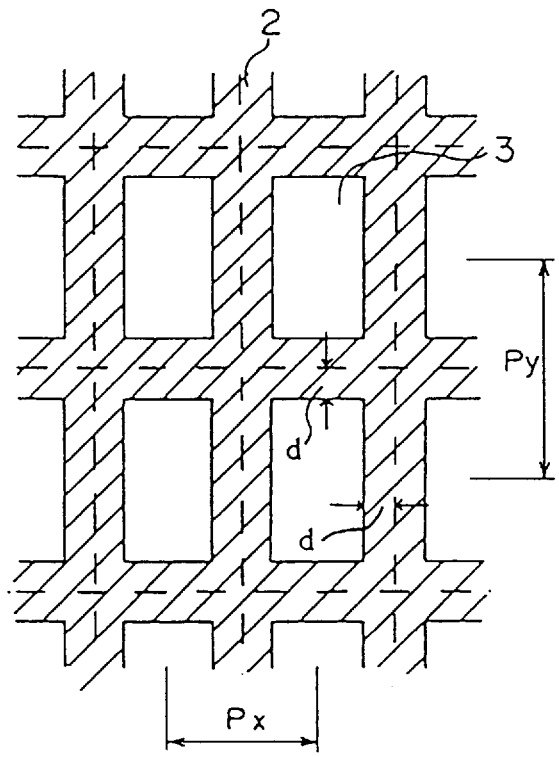
F I G. 1 6 A
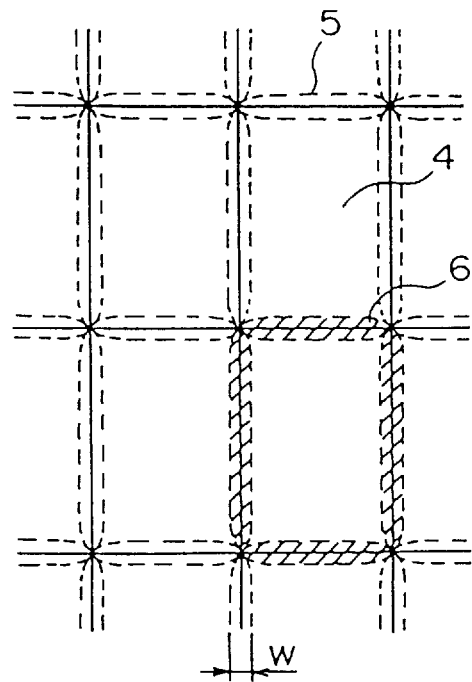
F I G. 1 6 B

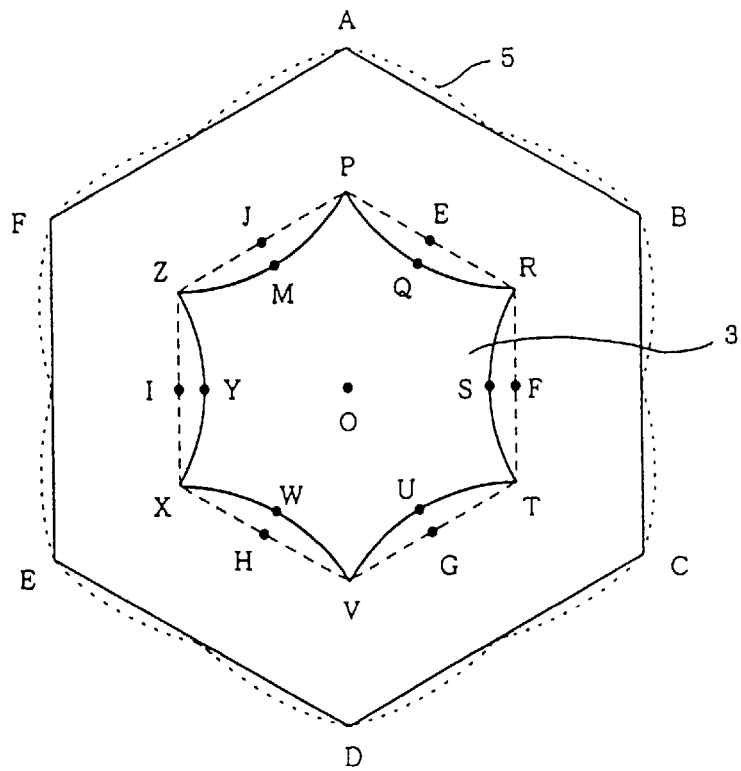
F I G. 2 1 A
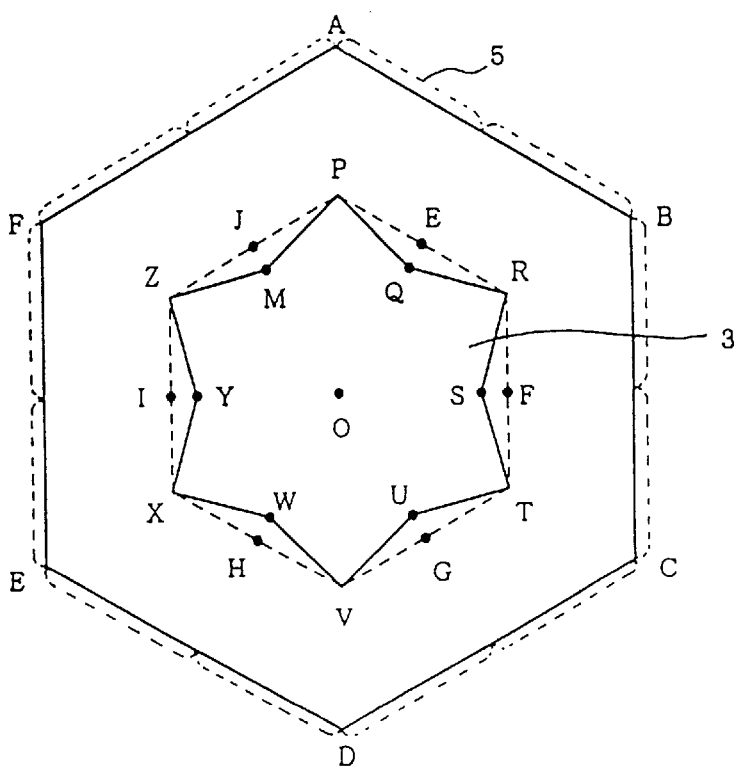
F I G. 2 1 B

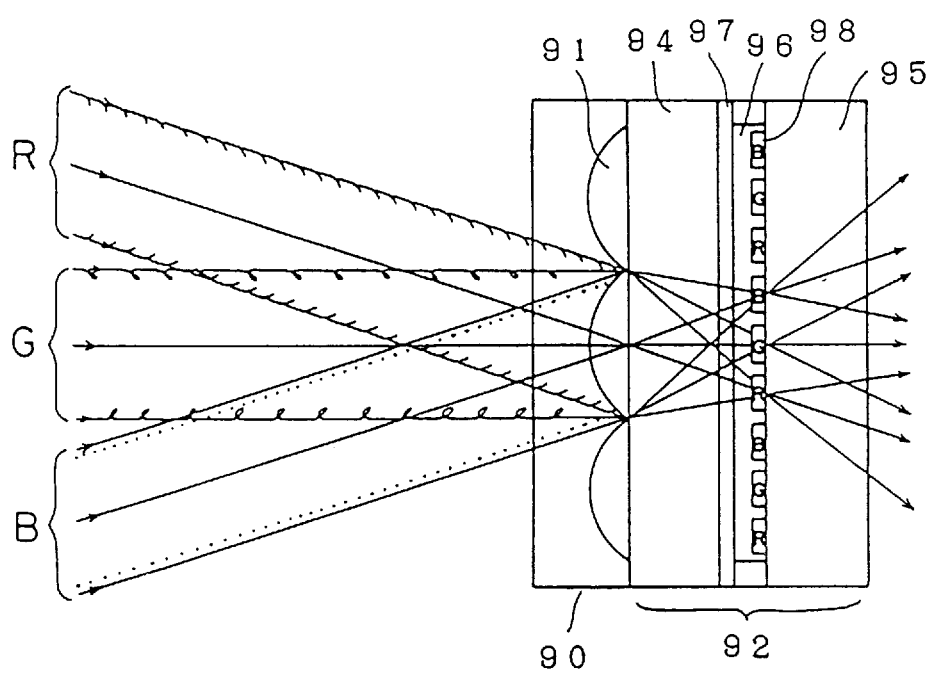
F I G. 2 5

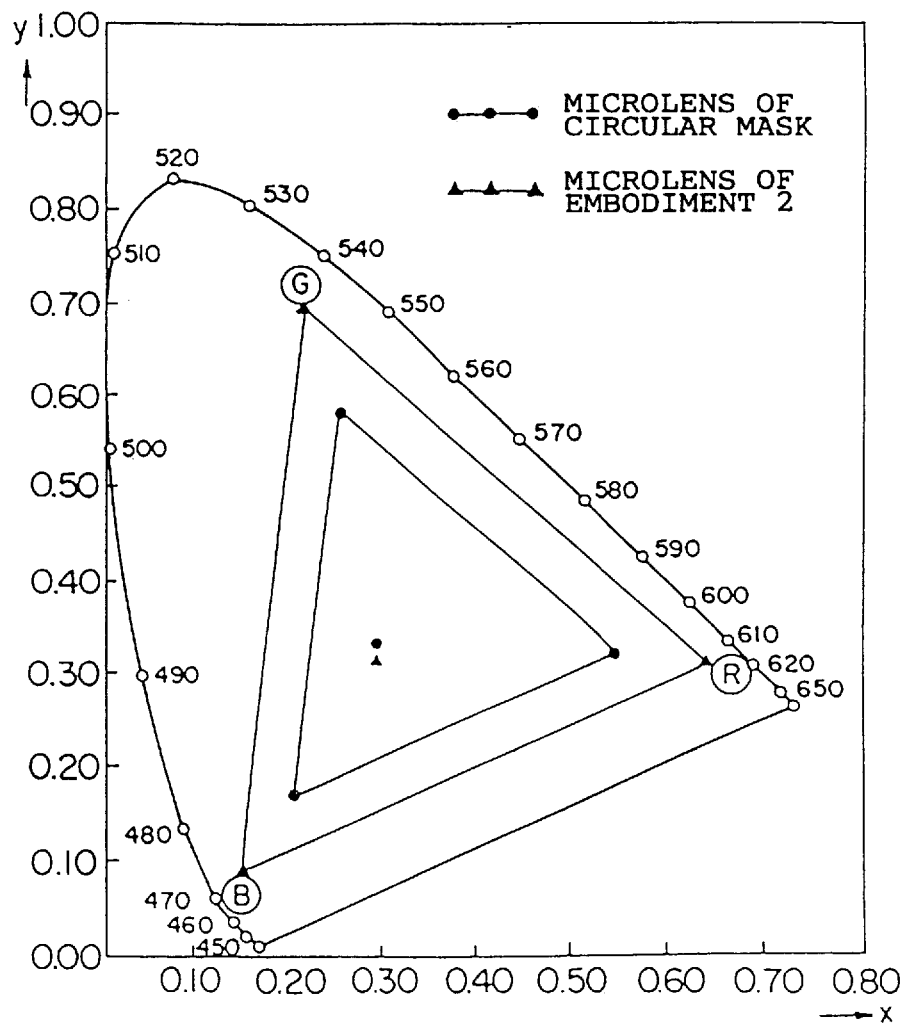
F I G. 2 6

PLANAR MICROLENS ARRAY AND METHOD OF MAKING SAME

TECHNICAL FIELD

The present invention relates generally to a planar microlens array and a method of making the same, and more particularly to a planar microlens array that is useful as a converging lens to converge light for illuminating a transmissive image display panel, such as a liquid crystal display panel having a plurality of pixels, onto pixel apertures to make the liquid crystal display panel brighter, and a method of making the same.

BACKGROUND ART

This type of planar microlens array was disclosed by Hamanaka, et al. in Japanese Patent Publication No. 3-136004 (Refer to FIG. 1). The planar microlens array disclosed in the Publication is manufactured using the ion diffusion process. In the ion diffusion process, a glass substrate is used as a transparent substrate 1 on the surface of which a diffusion-inhibiting mask film comprising Ti, Al, Ni or Cr, etc. is formed using the sputtering and other thin-film forming processes, and then a desired array of circular mask apertures is formed on the diffusion-inhibiting mask film. After that, the transparent substrate is immersed for a predetermined period of time in a molten-salt bath containing ions contributing to increasing the refractive index of the substrate. As ions in the molten-salt bath are diffused through the mask apertures in the transparent substrate, a planar microlens array 82 having a plurality of microlenses of a refractive-index distribution type with decreasing refractive index from the vicinity of the center of each mask aperture toward the circumference thereof is formed. In a liquid crystal display panel having a delta (six-lobe) pixel array, this planar microlens array has microlenses of a hexagonal circumferential shape that are arranged two-dimensionally, regularly and densely on the surface of the transparent substrate, as shown in FIG. 1. In this case, the lens array is a six-lobe array.

The circumferential shape of each microlens can be made into a desired hexagonal shape by providing a region 6 where the diffusion fronts 5 that are leading edges of the microlens ion diffused areas of the adjoining microlenses 4 are fused together, as shown in FIG. 2. In this case, lens filling rate, the ratio of the area occupied by microlenses to the total area of the transparent substrate on which lenses are formed, is almost 100%.

Oikawa et al., on the other hand, disclosed a planar microlens array for use in liquid crystal display panels in Japanese Patent Publication No. 5-45642 (Refer to FIG. 3). A planar microlens array 82 is formed with the ion diffusion process using a diffusion-inhibiting mask film having formed oblong mask apertures. This planar microlens array 82 has microlenses 4 of an oblong circumferential shape, as shown in FIG. 4, by terminating ion diffusion in the state where diffusion fronts of the adjoining microlenses come in contact with each other. With this, the lens filling rate is short of 100% because of the existence of a lens unformed region where no lenses are formed, but a planar microlens array 82 having a relatively high lens filling rate is formed since the lens array is of a six-lobe type.

These planar microlens arrays are suitable for condenser lenses to illuminate display images by converging light to illuminate a transmissive display panel, such as a liquid crystal display panel having a plurality of pixels, onto pixel apertures. A typical projection-type image display device having such a planar microlens array is shown in FIG. 5.

In FIG. 5, the light emitted by a light source 86 is converged by a reflecting mirror 87 and a condenser lens 85 so as to direct toward a projection lens 89. The light flux passing through the condenser lens 85 is converged by a planar microlens array 82 onto a pixel aperture area (pixel aperture) 81*b* of a liquid crystal element formed between two substrates 81*a* of a liquid crystal panel 81, and projected onto a screen 88 by the projection lens 89.

By using a planar microlens array as described above, the light flux that would otherwise been shielded by the pixel shielding area 81*c* of the liquid crystal display panel 81 can be converged onto the pixel aperture area 81*b*. As a result, the light flux reaching the screen 88 increases 2 to 2.5 times as much as that without the planar microlens array 82.

The technologies disclosed in Japanese Patent Publication No. 3-136004 and Japanese Patent Publication No. 5-45642 are intended to improve overall converging efficiency in converging light onto the pixel apertures of the liquid crystal element. To further improve converging efficiency, it is generally necessary to further increase the lens filling rate of the planar microlens array. With the six-lobe lens array as disclosed in Japanese Patent Publication No. 3-136004, the lens filling rate is almost 100%, with virtually no room left for further improvement. In terms of the improvement of overall converging efficiency, however, there still remains a problem. That is, regions where the diffusion fronts of the adjoining lenses are fused together contribute little to the conversion of light onto the pixel apertures that is illuminated because of their high astigmatism due to lowered rotational symmetry of the concentration distribution of diffused ions. In other words, an increase in the area where diffusion fronts are fused together could lead to a decrease, far from an improvement, in overall converging efficiency, even with 100% of the lens filling rate.

Now, a model for forming two microlenses on a flat substrate with an ion diffusion process using circular mask apertures will be taken up as an example for simplicity. FIGS. 6A through 6C are partially cross-sectional perspective views illustrating the state where two microlenses are formed on a transparent substrate 1. Ions are diffused through a circular mask aperture as a diffusion center 52, and diffusion fronts 5 that are leading edges of diffusion areas spread in concentrical semispheres. With the progress of ion diffusion, the two diffusion fronts eventually come into contact with each other (FIG. 6A). As ion diffusion further proceeds, the diffusion fronts are fused together, and the ion concentration gradient in the direction of a line connecting the adjoining diffusion centers decreases in the fused area. Thus, the diffusion speed in that direction decreases, and as a result, the diffusion fronts in the fused area form a continuum of curved surface, expanding in the direction orthogonally intersecting the aforementioned direction (in the direction of the boundary line with the adjoining lens) (FIGS. 6B and 6C). FIG. 7 is a perspective view illustrating a solid body formed by the diffusion fronts viewed from the direction opposite to the surface on which lenses are formed. The area in which these diffusion fronts have been fused together is called an overlapped diffusion area 6. The length of the overlapped diffusion area 6 in the direction of a line connecting the lens centers is called the width W of the overlapped diffusion area 6.

As the overlapped diffusion area 6 receives ions fed by both the diffusion centers 52 as the ion sources, the concentration distribution of diffused ions forms a gentle saddle shape in the direction of a line connecting the lens centers (in the X direction shown in FIG. 7). The overlapped diffusion area 6 has a lower refracting power than an equivalent independent microlens, causing a remarkable astigmatism, because of the smaller gradient of its ion concentration distribution in the X direction. Consequently, the light incident on this overlapped diffusion area 6 hardly converge on the neighborhood of the focal point of each lens on which the light is originally to converge, but on a narrow strip-like area connecting the centers of the adjoining lenses. The model of this state is shown in FIG. 8. In the figure, numeral 41 denotes a focal point of the microlens 4, 42 a converging area of the microlens, and 43 a converging plane, respectively. The light incident on the overlapped diffusion area 6 also converges on a strip connecting the focal points 41.

DISCLOSURE OF THE INVENTION

It is an object of the present invention to provide a planar microlens array having a high converging efficiency regardless of how the planar microlens array is arranged.

It is another object of the present invention to provide a planar microlens array having an excellent overall converging efficiency, in which the converging efficiency of lens is not lowered even when the ratio of the area occupied by microlenses to the area of the substrate on which microlenses are formed, that is, the lens filling rate is increased.

It is still another object of the present invention to provide a method of manufacturing planar microlens arrays having an excellent overall converging efficiency.

The present invention is characterized by a planar microlens array having arranged two-dimensionally and regularly on the surface of a planar transparent substrate a multitude of refractive-index distribution type microlenses formed by diffusing in the substrate a material contributing to increasing the refractive index of the substrate, in which the microlenses are densely arranged on the substrate surface, the diffusion front of each microlens is fused with the diffusion front of an adjoining microlens to form a fused area, and the length in the direction of a line connecting the centers of the microlenses of the fused area of certain two adjoining microlenses is less than 20% of the array pitch.

The present invention is characterized by a planar microlens array having arranged two-dimensionally and regularly on the surface of a planar transparent substrate a multitude of refractive-index distribution type microlenses formed by diffusing in the substrate a material contributing to increasing the refractive index of the substrate, in which the microlenses are arranged virtually densely on the surface of the substrate, and the diffusion front of each microlens comes in contact with the diffusion front of an adjoining microlens in a straight line without fusing with each other.

The method of manufacturing planar microlens arrays according to the present invention is characterized in that the manufacturing method includes a step for preparing a planar transparent substrate, a step for forming a diffusion-inhibiting mask film having a multitude of two-dimensionally regularly arranged mask apertures on the surface of the substrate, and a step for forming microlenses of a polygonal circumferential shape over the practically entire surface of the substrate by diffusing in the substrate from the mask apertures a material contributing to increasing the refractive index of the substrate; in the step of forming the diffusion-inhibiting film, the shape of the mask apertures being set so that the diffusion fronts corresponding to the sides of the microlenses being formed are arranged in a straight line.

The method of manufacturing planar microlens arrays according to the present invention is characterized in that the manufacturing method includes a step for preparing a planar transparent substrate, a step for assuming that the desired circumferential shape of microlenses being formed is a polygon, and forming on the surface of the substrate a diffusion-inhibiting mask film having within the polygon a multitude of regularly arranged mask apertures of a shape defined by straight lines parallel with the sides of the polygon and having predetermined intervals from the sides of the polygon, and a step for forming microlenses over the practically entire surface of the substrate by diffusing in the substrate through the mask apertures a material contributing to increasing the refractive index of the substrate.

The method of manufacturing planar microlens arrays according to the present invention is characterized in that the manufacturing method includes a step for preparing a planar transparent substrate, a step for assuming that the desired circumferential shape of microlenses being formed is a first polygon and a second polygon defined by straight lines parallel with the sides of the first polygon and having predetermined intervals from the sides thereof, and forming on the surface of the substrate a diffusion-inhibiting mask film having a multitude of regularly arranged mask apertures having a shape defined by curves or broken lines passing the inside of the second polygon, rather than a line connecting the adjoining apexes of the second polygon, and a step for forming lenses over the practically entire surface of the substrate by diffusing in the substrate through the mask apertures a material contributing to increasing the refractive index of the substrate.

BRIEF DESCRIPTION OF THE DRAWINGS

FIG. 7 is a perspective view illustrating a solid body formed when the diffusion fronts have been fused together.

FIG. 8 is a perspective view of a model of assistance in explaining the state of an ideal fusion from a rectangular mask aperture.

FIG. 9A is a diagram illustrating a four lobe array of lenses.

FIG. 9B is a diagram illustrating a six-lobe array of lenses.

FIG. 10 is a model diagram of assistance in explaining the state of an ideal fusion from a rectangular mask aperture.

FIGS. 11A through 11C are diagrams illustrating the state where a diffusion front having rounded corners is formed from a rectangular mask aperture.

FIG. 12A is a diagram illustrating a diffusion-inhibiting mask film having circular mask apertures FIG. 12B is a diagram illustrating a four lobe planar microlens array prepared using the diffusion-inhibiting mask film shown in FIG. 12A.

FIG. 16A is a diagram illustrating a diffusion-inhibiting mask film for preparing a planar microlens array embodying the present invention.

FIG. 16B is a diagram illustrating a planar microlens array prepared using the diffusion-inhibiting mask film shown in FIG. 16A.

FIGS. 21A and 21B are diagrams illustrating still another embodiment of the planar microlens array according to the present invention.

FIG. 25 is a diagram illustrating the state where converged light spots of the fluxes of R, G and B colors are incident on the respective pixel apertures corresponding to the colors.

FIG. 26 is a chromaticity diagram of assistance in explaining the effects of an image display device using a microlens array according to the present invention.

BEST MODE FOR CARRYING OUT THE INVENTION

In a planar microlens array according to this invention, a multitude of lenses are densely, two-dimensionally and regularly arranged. Typical two-dimensional regular lens arrays include the four-lobe array and the six-lobe array. The four-lobe array is such that when one lens is noted from among lenses in the array, there are four lenses adjacent to that lens. The six-lobe array is such that when one lens is noted from among lenses in the array, there are six lenses adjacent to that lens.

FIG. 9A shows a four-lobe array of lenses that are rectangular in the circumferential shape on the orthogonal X-Y coordinate system, and FIG. 9B shows a six-lobe array of lenses that are rectangular in the circumferential shape on the orthogonal X-Y coordinate system. In the figure, $P_x$ denotes an array pitch in the X-axis direction, $P_y$ an array pitch in the Y-axis direction, respectively.

Now, the aspect ratio of a lens having a rectangular circumferential shape will be described. When it is assumed that the length of short sides of the lens is a and the length of the long sides is b, then $\alpha$ (=b/a) is called the aspect ratio. When this aspect ratio $\alpha$ is large, a planar microlens array having a relatively large effective area and a good converging efficiency can be manufactured by using masks having oblong apertures, as disclosed in Japanese Patent Publication No. 5-45642.

Typical planar microlens arrays suitable for liquid-crystal display panels largely have lenses of aspect ratios of less than 2. The relationship between the aspect ratio and the filling rate of lenses manufactured using masks having oblong apertures, as disclosed Japanese Patent Publication No. 5-45642, in the four-lobe array of rectangular lenses is shown in Table 1.

TABLE 1

The relationship between the aspect ratio and filling rate of lens (in the four-lobe array of rectangular lenses)

| Aspect ratio $\alpha$ | Lens filling rate | Aspect ratio $\alpha$ | Lens filling rate |
| --- | --- | --- | --- |
| 1.0 | 0.785 | 1.6 | 0.866 |
| 1.1 | 0.805 | 1.7 | 0.874 |
| 1.2 | 0.821 | 1.8 | 0.881 |
| 1.3 | 0.835 | 1.9 | 0.887 |
| 1.4 | 0.847 | 2.0 | 0.893 |
| 1.5 | 0.857 | | |

The table indicates that as the lens aspect ratio increases from 1.0 to 2.0, the lens filling rate increases.

Next, the shape of mask apertures will be discussed.

The microlens array disclosed in Japanese Patent Publication No. 3-136004 is of a six-lobe array where the circumferential shape of microlenses is hexagonal. The shape of mask apertures is circular.

Figure 1:
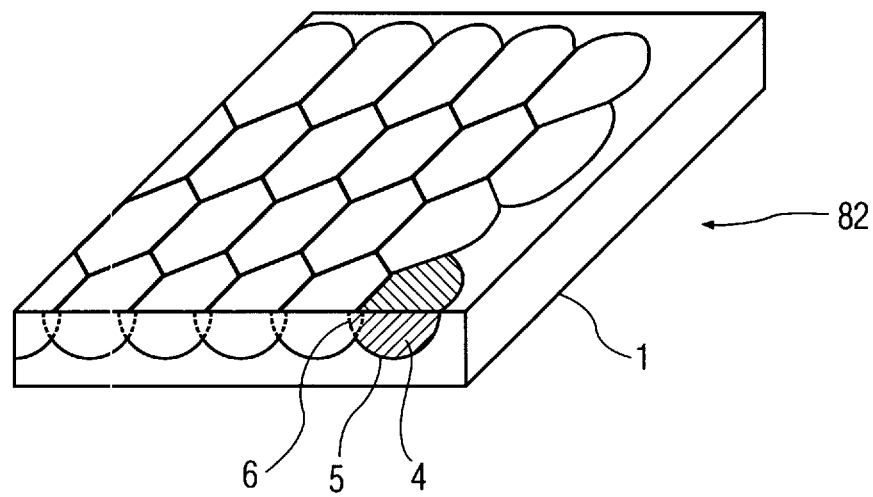
FIG. 1 is a perspective view of a prior-art planar microlens array.
Figure 2:
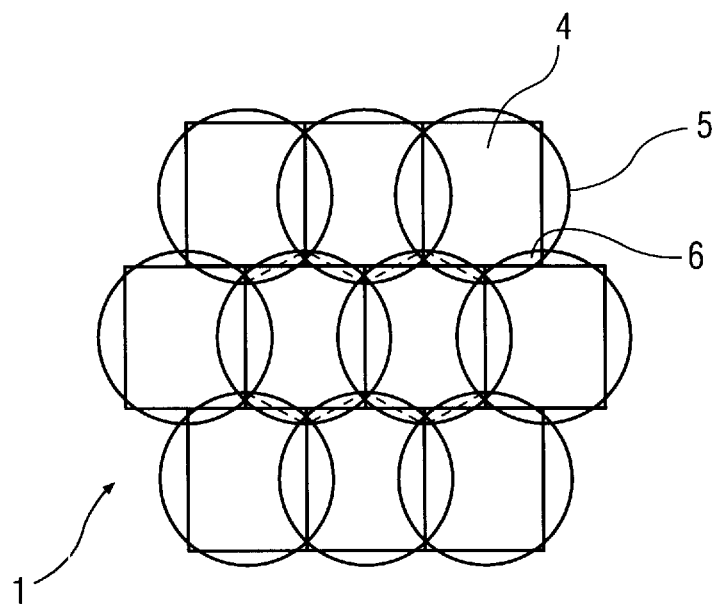
FIG. 2 is a plan view of the planar microlens array shown in FIG. 1.
Figure 3:
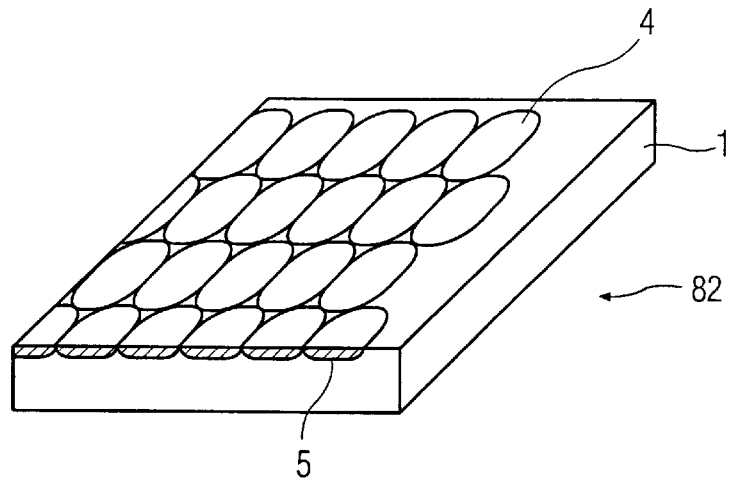
FIG. 3 is a perspective view of another prior-art planar microlens array.
Figure 4:
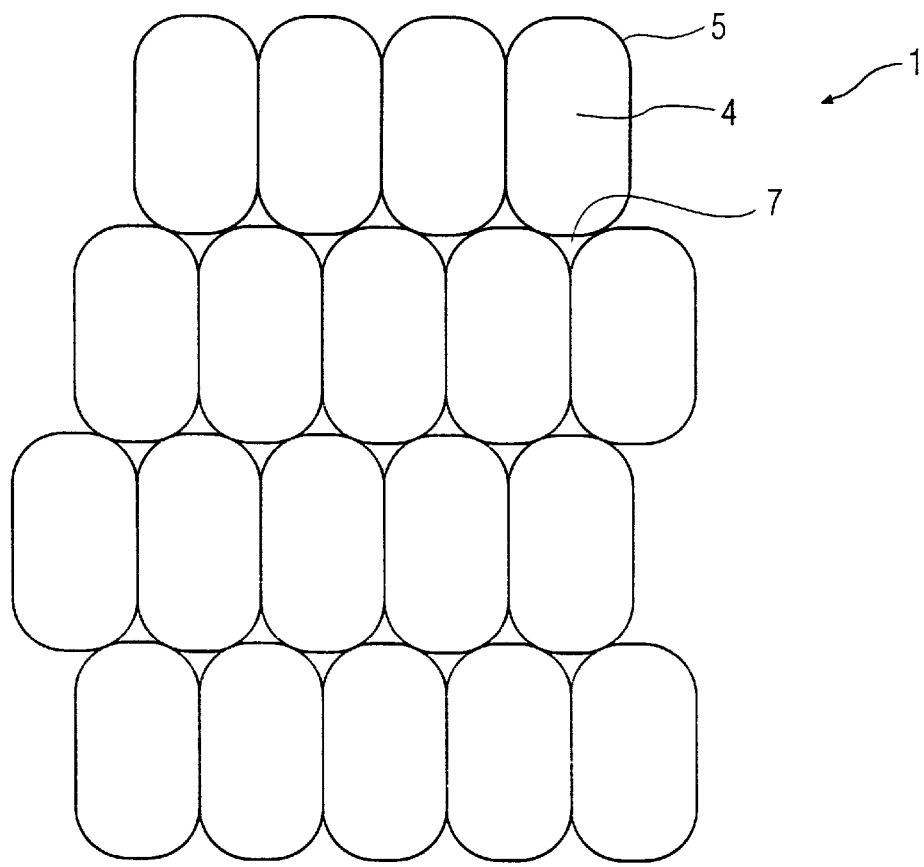
FIG. 4 is a plan view of the planar microlens array shown in FIG. 3.

In the meantime, the shape of mask apertures when manufacturing with the diffusion process lenticular lenses of a virtually semi-circular cross-sectional shape is linear (refer to FIG. 3 in Japanese Patent Publication No. 61-201639, for example.) A detailed study of the state of diffusion at this time reveals that a diffusion front diffused through a given mask aperture proceeds linearly in parallel with the linear mask aperture. As the diffusion process further proceeds, that diffusion front comes in contact with another diffusion front through an adjacent mask aperture. Thus, lenticular lenses can be formed without gaps over the entire surface of the substrate.

The inventors of this application further advanced this idea and invented the present invention by switching from the prior-art mask apertures of a circular or oblong shape to mask apertures of a rectangular shape in order to form lenses two-dimensionally without gaps over the entire surface of the substrate. FIG. 10 shows an ideal diffusion model from a mask aperture of a rectangular shape. Rounded corners of the diffusion front 5 in this figure are attributable to the fact that ions are spot-diffused starting from the four corners of the mask aperture 3. In the figure, numeral 51 denotes an iso-refractive-index curve.

If the dimensions of mask apertures of a rectangular (square or rectangular) shape are relatively small, contribution of the rounded corner of a diffusion corner increases, with the result that the entire diffusion-front shape becomes dull.

This will be described taking as an example a microlens of a 100 $\mu$m×100 $\mu$m in circumferential shape. FIG. 11A shows a diffusion front 5 (mask aperture 3: a 60 μm×60 μm square, distance d between the neighborhood of lens and mask aperture: 20 μm, and diffusion length: 28 μm). The front 5 of the diffusion region extending from the mask aperture 3 becomes a rectangular-shaped region, with rounded corners, that is obtained by adding an area equal to the diffusion length to the periphery of the mask aperture.

With the dimensions of microlenses being the same, however, if the distance d is increased to obtain a relatively small rectangular mask aperture, the contribution of the spot diffusion effect at corners increases, and as a result, the shape of the diffusion front becomes dull, approaching a circle. FIGS. 11B and 11C show the approximate shapes of diffusion fronts when mask apertures are a 50 μm×50 μm square and a 40 μm×40 μm square, respectively, and the diffusion length is set so that the diffusion regions becomes sufficiently dense with virtually no gaps. As is apparent from the figures, when the shape of a mask aperture is small, the overlapped diffusion regions become larger, making it difficult to obtain a good converging effect. This holds true not only for rectangular shapes but also for other polygonal shapes.

In this way, with the relatively smaller shape of mask apertures, compared with the circumferential shape of microlenses, if the overlapped diffusion regions become larger due to the dulled corners of the diffusion fronts, that is, the contribution of the spot diffusion effect, it is necessary to modify the shape of mask apertures.

In such a case, by modifying the shape of mask apertures into a shape of a polygon having inwardly concave sides by the amount of rounding of the diffusion fronts (hereinafter referred to as a star shape), the area of the overlapped diffusion regions can be reduced, thereby a larger converging effect can be obtained.

Next, mask aperture setting conditions will be studied.

To set the lens filling rate at almost 100% as one of mask aperture setting conditions, the ratio of the width W of the overlapped diffusion regions between two adjoining microlenses to the array pitch in the direction of a line connecting the centers of the two adjoining microlenses should preferably be less than 20%. In order to have the width W of the overlapped diffusion regions of almost zero, it is desirable to set the lens filling rate at more than 91%.

By changing diffusion conditions from those where there are no overlapped diffusion regions (where there are lens unformed regions, with the diffusion fronts coming in contact with each other) to those where there are overlapped diffusion regions and the lens filling rate is 100% (where there are no lens unformed regions), a planar microlens array having both overlapped diffusion regions and microlens unformed regions can be formed. In this case, too, mask aperture forming and diffusion conditions should preferably be such that the ratio of the width W of the overlapped diffusion regions between two adjoining microlenses to the array pitch in the direction of a line connecting the centers of the two adjoining microlenses is less than 20%, and the lens filling rate is more than 91%.

The diffusion process in the present invention is not limited to the ion diffusion process. The anneal process (Japanese Patent Publication No. 60-256101, for example) for forming the refractive-index profile by thermal diffusion in which a thin film of a diffusion material is formed at positions corresponding to mask apertures, or the monomer diffusion copolymerization process (Japanese Patent Publication No. 2-50102, for example) in which after a plastic substrate is obtained by semi-polymerizing a first monomer on a transparent substrate, and then a second monomer is diffused over the plastic substrate to complete polymerization may also be employed. In short, any methods of diffusing over a transparent substrate a material contributing to increasing the refractive index of the substrate to form a planar microlens array having a refractive-index gradient based on the concentration gradient of the material may be used.

Furthermore, the mask aperture according to the present invention may be of a polygonal shape having straight chamfered portions about a few μm long or minute circular-arc portions on the apexes thereof, with no differences in its effects between them.

(Preliminary tests)

Prior to the description of embodiments of the present invention, the problem of the converging efficiency of lens will be discussed based on the results of preliminary tests conducted to compare the present invention with the prior art. Now, a planar microlens array as shown in Japanese Patent Publication No. 3-136004, to which a four-lobe array of lenses having a rectangular circumferential shape is applied, will be taken as an example. FIG. 12A is a plan view of a diffusion-inhibiting mask film, FIG. 12B is a plan view of a planar microlens array prepared using this diffusion-inhibiting mask film.

As shown in FIG. 12A, ions were diffused through circular mask apertures 3 arranged at pitches $P_x$ and $P_y$ in X and Y directions, and overlapped diffusion regions 6 were provided between adjoining microlenses 4, as shown in FIG. 12B, so that the lens filling rate would become 100% and the circumferential shape of microlenses 4 would be of a rectangular shape. In this case, it was indicated that the width W of the overlapped diffusion region becomes very larger on the long sides of the rectangular microlens, compared with the six-lobe array of microlenses of a hexagonal circumferential shape because the diffusion fronts 5 become circles circumscribed with the rectangular microlenses 4.

In the meantime, the effects of the presence of overlapped diffusion regions on the converging performance of microlenses were studied through experiments. Planar microlens arrays of several types were manufactured with the ion diffusion process using soda-lime glass as transparent substrates, on which Tl ions as ions contributing to increasing the refractive index of the substrate were diffused through circular 60 μm-dia mask apertures arranged at pitches of $P_x=100$ μm in the X direction and $P_y=100$ μm in the Y direction by controlling ion diffusion conditions so that diffusion fronts would become 100–141 ($=\sqrt{2}\times100$) μm circles.

As a result, it was revealed that the degree of fusion of diffusion fronts 5 between adjoining microlenses 4 increases where the width W of overlapped diffusion regions can be estimated to exceed 20% of the corresponding array pitch in the X or Y direction. It was also revealed that this substantially reduces the converging efficiency of microlenses.

Figure 13:
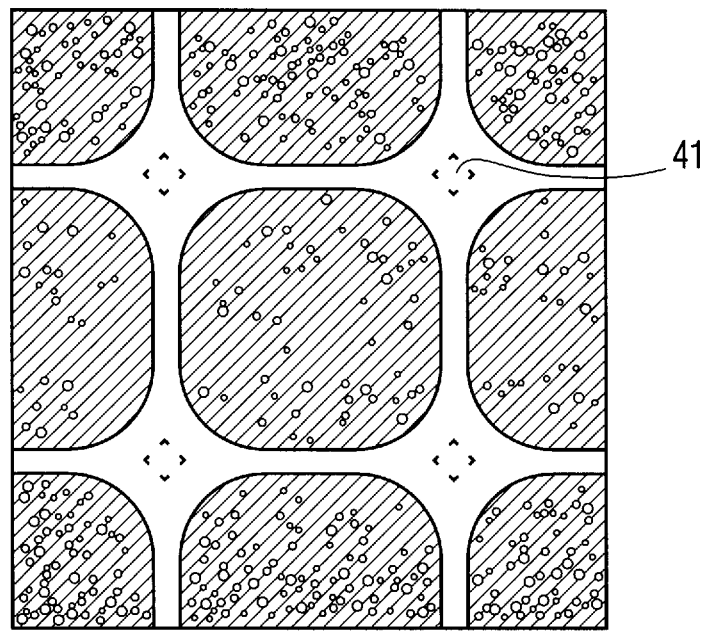
FIG. 13 is a diagram illustrating converged light spots obtained through a planar microlens array comprising square lenses prepared using a diffusion-inhibiting mask film having circular apertures.

FIG. 13 shows a photograph of converged spots observed with an optical microscope by throwing almost parallel light on a planar microlens array in the state where the diameter of diffusion fronts was 141 μm. In the figure, numeral 41 is a focal point of the microlenses. In this instance, the width W of the overlapped diffusion regions 6 was estimated at 41 μm, or 29% of the array pitches in the X and Y directions. The light incident on the overlapped diffusion regions 6 was not converged not only on the vicinity of the focal points of the microlens 4 but also on the crosslines connecting the focal points of the adjoining lenses.

Figure 5:
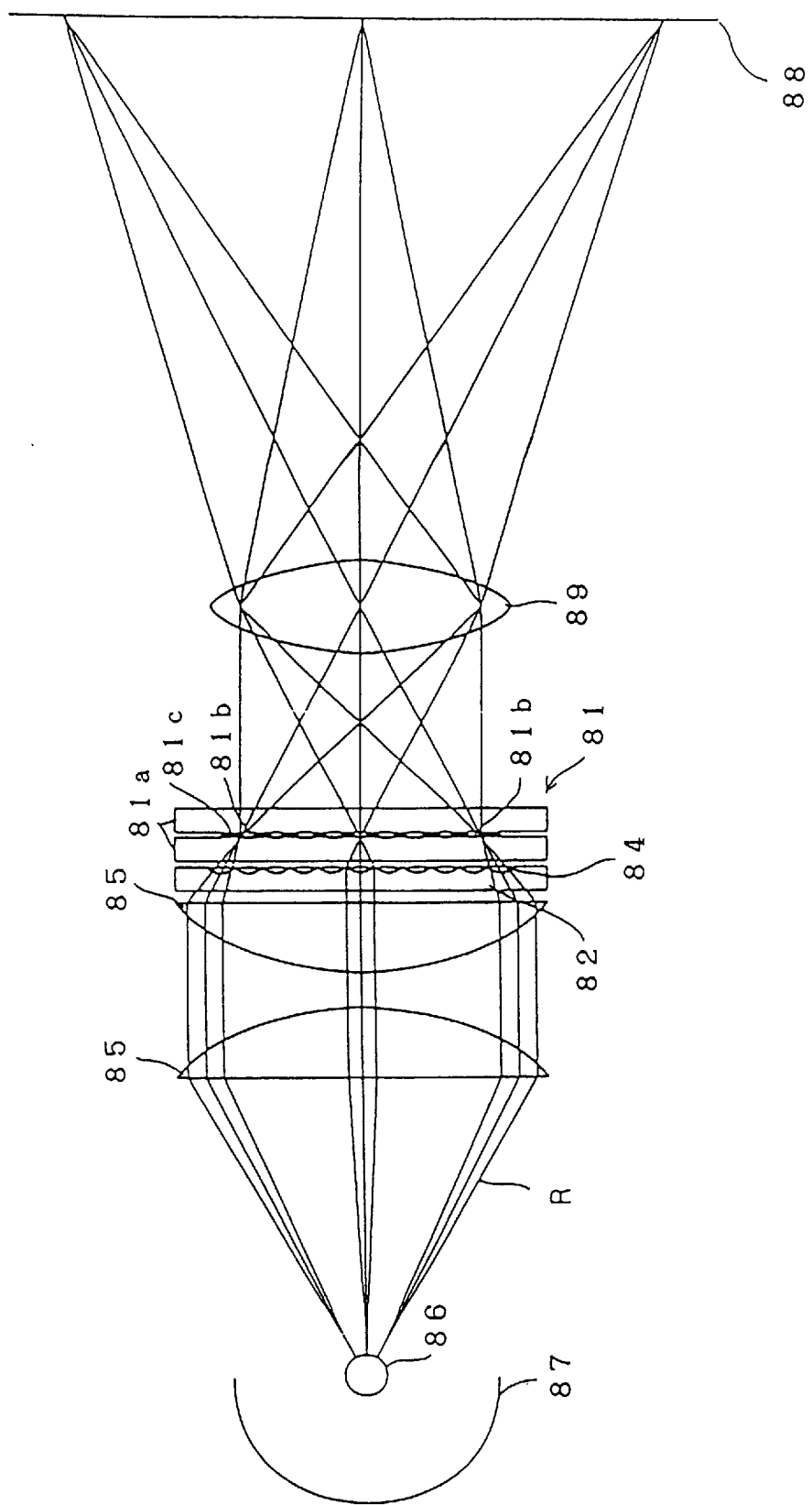
FIG. 5 is a cross-sectional view of optical paths in an image display device.
Figure 6A:
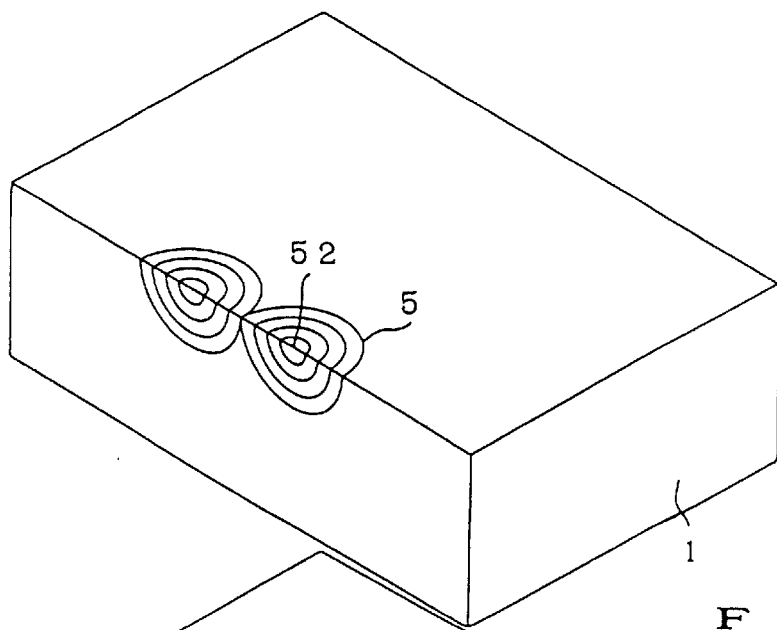
FIGS. 6A through 6C are partially cross-sectional perspective views illustrating a model of assistance in explaining the state where diffusion fronts are fused together.
Figure 6B:
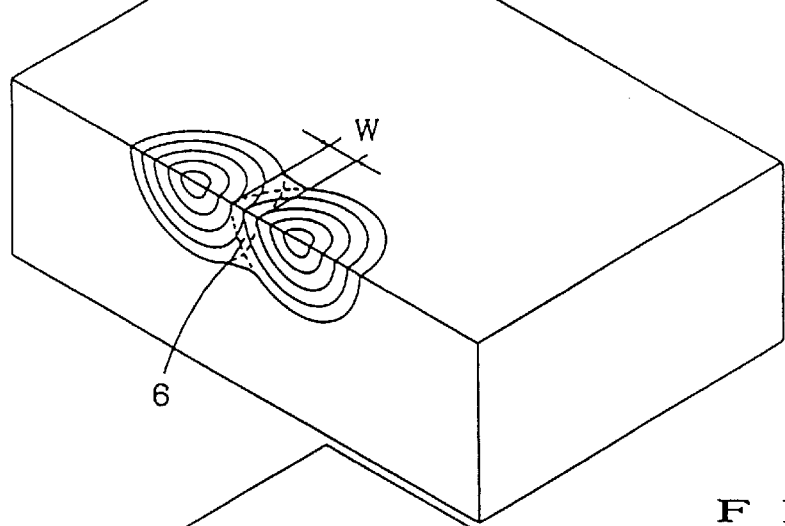
Figure 6C:
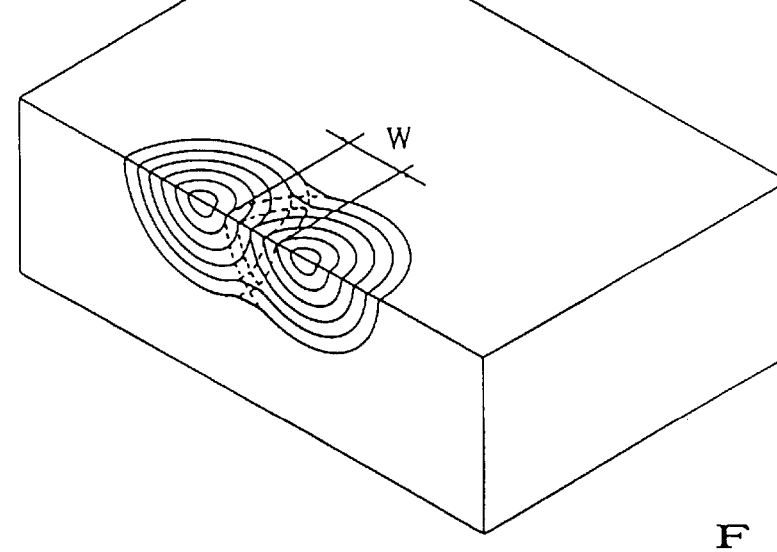
Figure 14:
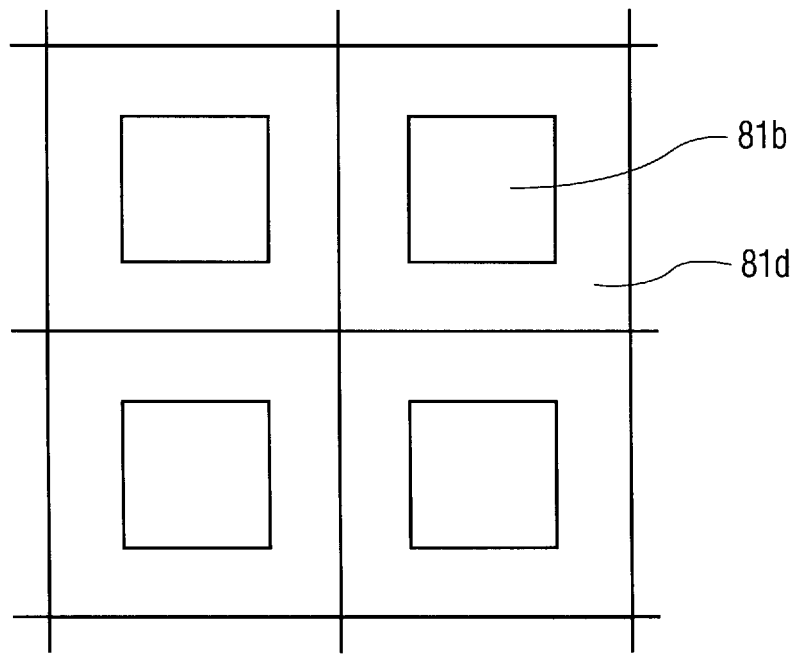
FIG. 14 is a diagram illustrating the relationship between pixels (microlenses) and pixel apertures.

The aforementioned planar microlens array was used as the planar microlens array 82 of the image display device shown in FIG. 5, and a liquid-crystal display panel of 100 µm×100 µm square-shaped pixels 81d and 55 µm×55 µm square-shaped pixel-aperture regions 81b was used as the liquid-crystal display panel 81 in the figure (refer to FIG. 14). In this case, it was revealed that the amount of light converging within the aperture regions 81b accounts for 52% of the incident light, and the amount of light reaching the screen 88 is reduced to less than 0.8 times as much as that in the six-lobe array of hexagonal lenses.

Next, the problem of the lens filling rate will be discussed.

In Japanese Patent Publication No. 5-45642, the area ratio of microlens unformed regions is small, that is, the lens filling rate is sufficiently high for practical use, in the case of the six-lobe microlens array. With the square microlens array, however, it was indicated that when oblong microlenses are arranged densely, the ratio of microlens unformed regions is increased, that is, the lens filling rate is reduced.

Figure 15A:
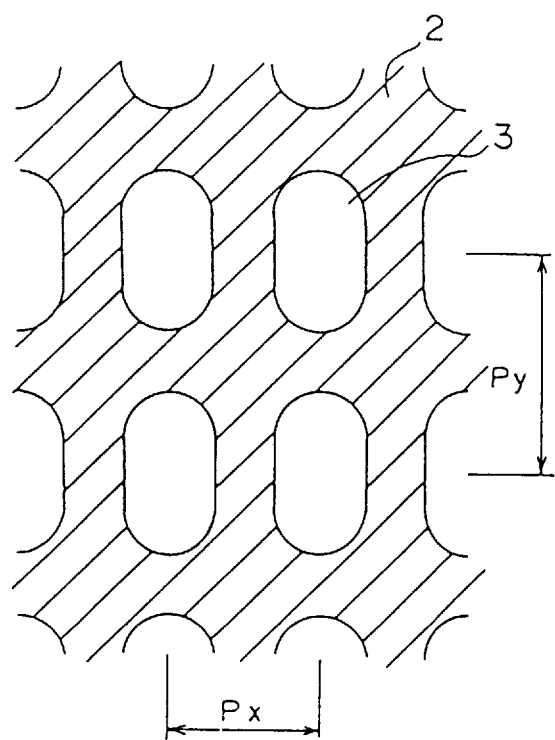
FIG. 15A is a diagram illustrating a diffusion-inhibiting mask film having oblong mask apertures.
Figure 15B:
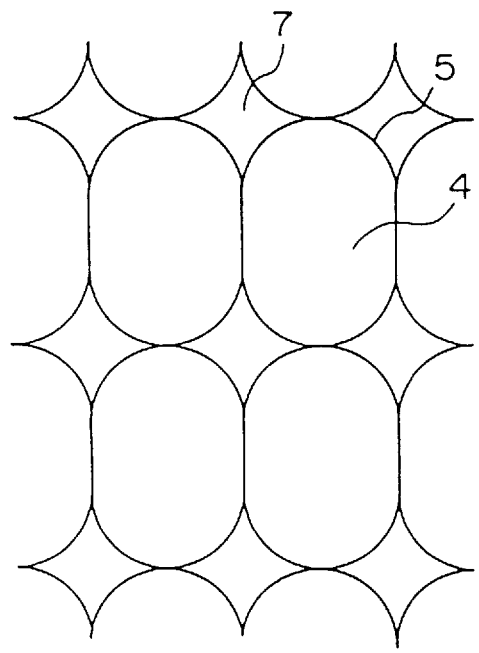
FIG. 15B is a diagram illustrating a four lobe planar microlens array prepared using the diffusion-inhibiting mask film shown in FIG. 15A.

An example where the planar microlens array as disclosed in Japanese Patent Publication No. 5-45642 is applied to a four-lobe array is shown in FIGS. 15A and 15B. FIG. 15A is a plan view of a diffusion-inhibiting mask film, and FIG. 15B is a plan view of a planar micro-lens array manufactured using this diffusion-inhibiting mask film.

An oblong microlens 4 inscribed in a rectangle can be formed by diffusing ions through the oblong mask aperture 3 and terminating ion diffusion in the state where diffusion fronts 5 come in contact with each other between the adjoining microlenses 4. It was revealed, however, that the lens filling rate is substantially reduced because the microlens unformed regions 7 become very large, and as a result, the converging efficiency of microlenses is also decreased by the amount of decrease in the lens filling rate.

With a four-lobe array of the X-direction pitch of $P_x=100$ µm and the Y-direction pitch of $P_y=150$ µm, for example, the lens filling rate is reduced to less than 80%. It was also revealed that when the above-mentioned microlenses are used in the image display device shown in FIG. 5, and a liquid-crystal display panel having approx. 100 µm×100 µm square-shaped pixels and 55 µm×55 µm square-shaped pixel aperture regions is used, the amount of light reaching the screen is reduced by the amount of decrease in the lens filling rate.

(Preferred Embodiment 1)

In the following, an embodiment of the present invention will be described, referring to the accompanying drawings.

FIGS. 16A and 16B are diagrams of assistance in explaining a first embodiment of a planar microlens array according to the present invention. In this embodiment, a four-lobe array around a rectangular-shaped microlens 4 and the ion-diffusion process were used.

First, a diffusion-inhibiting mask film 2 made of a Ti film was formed with the sputter process on a transparent substrate 1 made of soda-lime glass. Mask apertures 3 were formed on the diffusion-inhibiting mask film 2 as shown in FIG. 16A using known photolithographic and etching techniques.

The dimensions of the microlens 4 were such that the X-direction dimensions=X-direction pitch $P_x$ and the Y-direction dimensions=Y-direction dimensions $P_y$. Consequently, the shape of the mask aperture 3 could be a rectangle bordered with a predetermined distance d inside of the circumference of the microlens 4, and the dimensions of the mask aperture 3 could be set at the X-direction dimensions=$P_x-2d$, and the Y-direction dimensions=$P_y-2d$.

Next, the glass substrate 1 was immersed in a molten-salt bath containing Tl ions contributing to an increase in the refractive index of the substrate while controlling diffusion time so that diffusion proceeded until the diffusion fronts 5 reached apexes of a rectangular microlens 4 to form a planar microlens array 4 having a rectangular lens shape and the lens filling rate of almost 100%, as shown in FIG. 16B.

Figure 17:
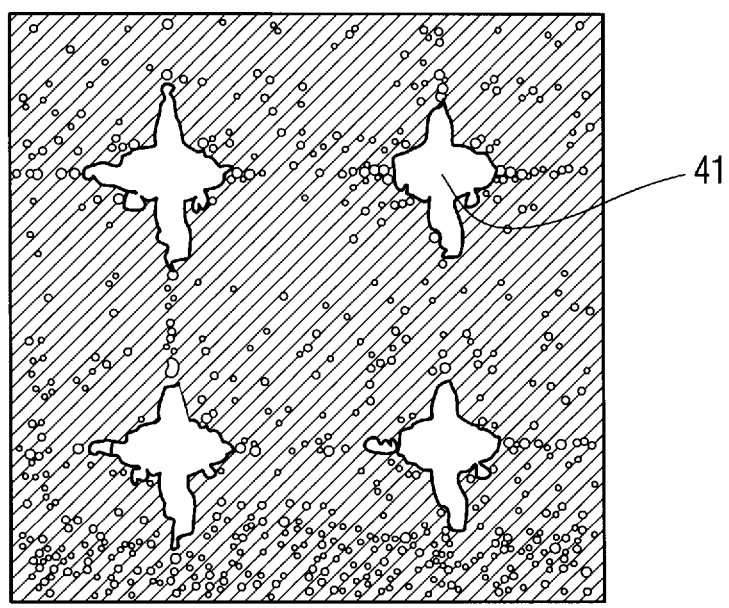
FIG. 17 is a diagram illustrating converged light spots obtained through the planar microlens array shown in FIG. 16B

With the lens of a square shape, a planar microlens array of a four-lobe array was manufactured by setting parameters for a mask aperture at $P_x=P_y=100$ µm, d=20 µm and the length of diffusion=28 µm, and controlling ion diffusion time. FIG. 17 is a photograph of converged light spots observed with an optical microscope by throwing light on this lens array. In this example, the width W of the overlapped diffusion regions 6 was estimated at 16 µm despite the lens filling rate of almost 100%. In this example, most of the incident light converged on the vicinity of the focal points 41 of the microlenses 4, though the shape of the converged light spot had some crosslines, because the width W was less than 20% of the X- and Y-direction array pitches.

(Preferred Embodiment 2)

Figure 18A:
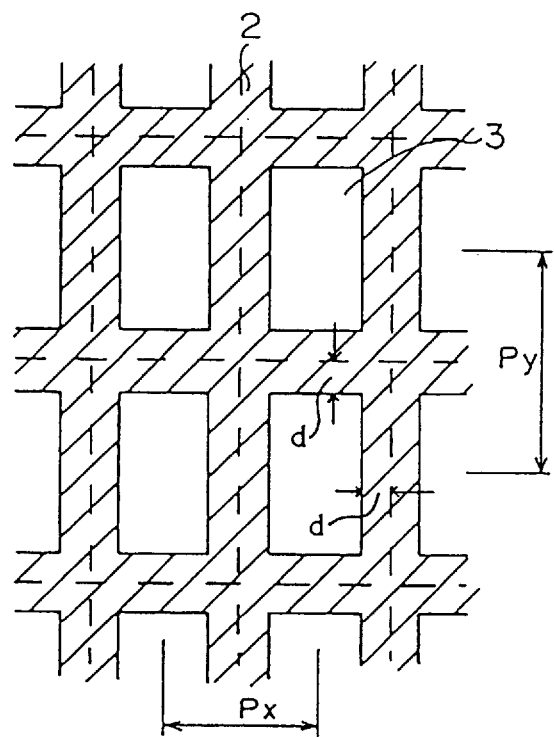
FIG. 18A is a diagram illustrating a diffusion-inhibiting mask film for preparing a planar microlens array that is still another embodiment of the present invention.
Figure 18B:
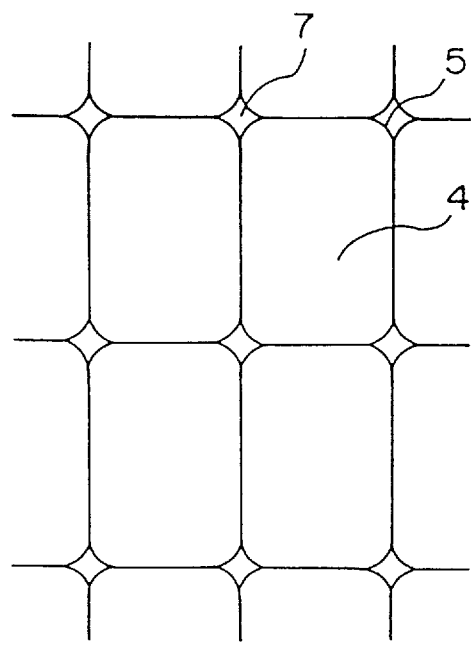
FIG. 18B is a diagram illustrating a planar microlens array prepared using the diffusion-inhibiting mask film shown in FIG. 18A.

FIGS. 18A and 18B are diagrams of assistance in explaining a second embodiment of a planar microlens array according to the present invention. In this embodiment, rectangular mask apertures 3 and the ion diffusion process similar to those used in Embodiment 1 were used, but diffusion time was controlled so that diffusion proceeded until diffusion fronts 5 came in contact with the adjoining diffusion fronts of the adjoining lenses to manufacture a planar microlens array 4 having rectangular microlenses whose corners were rounded, as shown in FIG. 18B.

Figure 19:
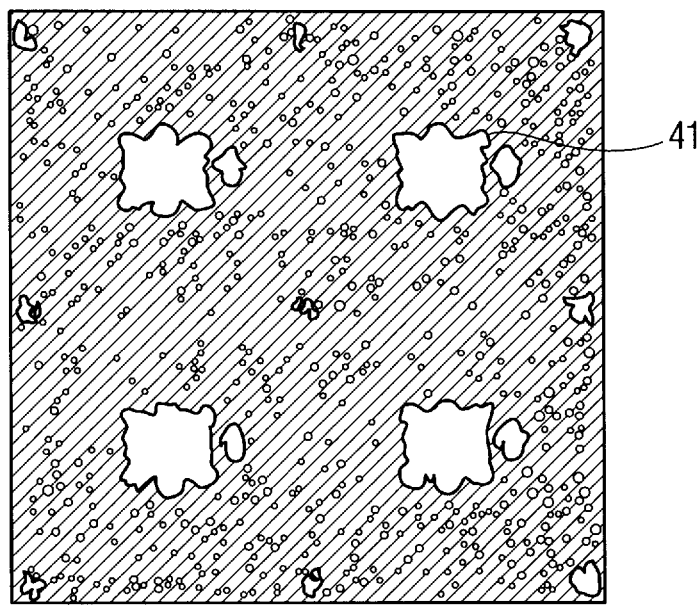
FIG. 19 is a diagram illustrating converged light spots obtained through the planar microlens array shown in FIG. 18B.

With the lenses of a square shape, a planar microlens array was manufactured by setting the parameters of the mask apertures at $P_x=P_y=100$ µm, d=20 µm and the length of diffusion=20 µm, and controlling ion diffusion time. FIG. 19 shows a photograph of converged light spots observed with an optical microscope by throwing almost parallel light on this lens array. In this example, most of the incident light converged on the vicinity of the focal points 41 of the microlenses 4 though there were some leaks of the incident light passing through the microlens unformed regions 7 because the lens filling rate was improved up to 97% despite the width W of the overlapped diffusion regions 6 was estimated at 0 µm.

(Preferred Embodiment 3)

In the above embodiments, planar microlens arrays of a four-lobe array were described. Although the present invention is particularly effective for four-lobe planar microlens arrays, but is not limited to that type of array. Needless to say, the present invention is also effective for six-lobe planar microlens arrays.

The method of designing the shape of mask apertures in the six-lobe array will be described in the following. With the six-lobe array, a typical circumferential shape of microlenses to be formed is a hexagon.

Now, with the distance between the center and apexes of a microlens being L, a hexagon enclosed by the following six points can be assumed: When it is assumed that on an orthogonal X-Y coordinate system, the X-direction array pitch is $P_x$ and the Y-direction array pitch is $P_y$, and the origin of the coordinate system is caused to agree with the center of a given microlens, and the coordinates of each apex are expressed by (x, y), then (x, y)=($P_x$/2, L/2), ($P_x$/2, -L/2), (O, -L), (-$P_x$/2, -L/2), (-$P_x$/2, L/2), and (O, L)

where $L=(P_x^2/8+2P_y^2)/P_y$.

Or, with the center of a microlens being the origin and the distance between the origin and the apexes thereof being m, a regular hexagon enclosed by the following six points can be assumed:

$(x, y)=(P_x-m, P_y/2), (m,O), (P_x-m, -P_y/2), (m-P_x, -P_y/2), (-m, O), (m-P_x, P_y/2)$ where $m=(2P_x^2+P_y^2/8)/P_x$.

Other circumferential shapes of microlenses that can accomplish a six-lobe array include a square, rectangle, rhombus, parallelogram.

As described above, once a desired circumferential shape of microlenses is selected, a shape enclosed by lines parallel with and separated by a predetermined distance d from the outline of the circumferential shape of the microlens can be obtained inside the circumferential shape as the shape of mask apertures.

(Preferred Embodiment 4)

This embodiment is intended to modify the shape of rectangular apertures when the overlapped diffusion regions become large due to the rounding of the diffusion regions, that is, due to the contribution of the spot diffusion effects when the shape of mask apertures is relatively smaller than the shape of the microlens, as described in reference to FIGS. 11A through 11C.

In this case, more pronounced light converging effects can be obtained by reducing the area of overlapped diffusion regions by changing the rectangular shape of mask apertures to a shape obtained by making the sides of the rectangle inwardly concave by the amount of rounding of the diffusion regions.

More quantitatively speaking, the advance distance (diffusion length) of diffusion fronts in FIGS. 11B and 11C in the direction of apexes (in the diagonal direction of the square) is different from that in the direction of sides (in the side direction of the square). It was experimentally demonstrated that the ratio between diffusion speed in the apex direction and that in the side direction are approximately 0.9:1. Thus, the shape of mask apertures is set so that the ratio between diffusion length in the apex direction and that in the side direction is maintained at 0.9:1.

Figure 20A:
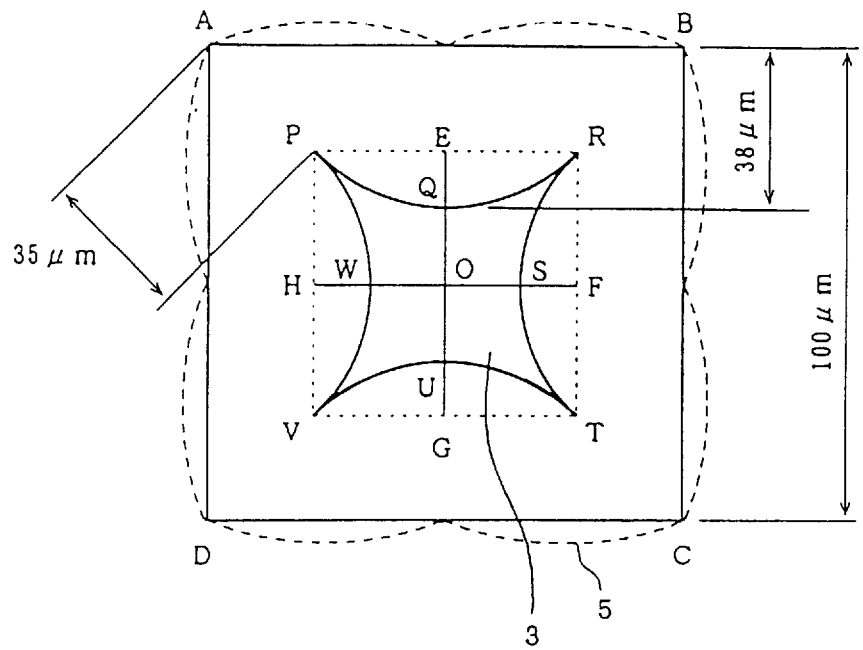
FIGS. 20A and 20B are diagrams illustrating still another embodiment of the planar microlens array according to the present invention.

The mask aperture shown in FIG. 20A is an example where the dependence of diffusion length on the shape of a mask aperture is taken into consideration. The circumferential shape of the microlens shown in the figure is a square having apexes A, B, C and D. When it is assumed that a second square (apexes P, R, T and V) enclosed by straight lines that are parallel with, and separated by a distance d=25 $\mu$m from each side of the original square is provided within the original square, the mask aperture has such a shape (star shape) formed by connecting curves passing points Q, S, U and W lying inside the straight lines connecting the apexes of the second square. The recommendable shape of these curves is a parabolic, elliptic, hyperbolic or any other quadratic curve passing those points, or curves similar to it.

The relative positions of points A, B, C and D, and points P, Q, R, S, T, U, V and W are determined in the following manner:

Point P; A point on line segment AO at which distance $L_{AP}$ from point A is such that $0.25L_{AO} \leq L_{AP} \leq 0.67L_{AO}$, or $L_{AP}=0.5L_{AP}$, for example.

Point R; A point on line segment BO at which distance $L_{BR}$ from point B is such that $L_{BR}=L_{AP}$.

Point T; A point on line segment CO at which distance $L_{CT}$ from point C is such that $L_{CT}=L_{AP}$.

Point V; A point on line segment DO at which distance $L_{DV}$ from point D is such that $L_{DV}=L_{AP}$.

Point Q; A point obtained by shifting point E, the bisecting point of line segment PR, by $L_{EQ}$ in the direction of point O where $0<L_{EQ} \leq 0.67L_{EO}$, or $L_{EQ}=0.52L_{EO}$, for example.

Point S; A point obtained by shifting point F, the bisecting point of line segment RT, by $L_{FS}$ in the direction of point O where $0<L_{FS} \leq 0.67L_{FO}$, or $L_{FS}=0.52L_{FO}$, for example.

Point U; A point obtained by shifting point G, the bisecting point of line segment TV, by $L_{GU}$ in the direction of point O where $L_{GU}=L_{EQ}$.

Point W; A point obtained by shifting point H, the bisecting point of line segment VP, by $L_{HW}$ in the direction of point O where $L_{HW}=L_{FS}$.

When $L_{AP}$ is smaller than $0.25L_{AO}$, it is difficult to form a lens having good lens action. When $L_{AP}$ is larger than $0.67L_{AO}$, the mask aperture becomes smaller, the adverse effects of point diffusion could result. When $L_{EQ}$ and $L_{FS}$ are larger than $0.67L_{EO}$ and $0.67L_{FO}$, respectively, the adverse effects of point diffusion could also result.

When the circumferential shape of a microlens is a 100 $\mu$m×100 $\mu$m square, and d=25 $\mu$m, then $L_{AP}=35$ $\mu$m, and the distance between points Q, S, U and W and the circumferential edges of the microlens is 38 $\mu$m. It is indicated that the shape of mask aperture is set so that the ratio between diffusion length in the apex direction and that in the side direction is 0.9:1.

When ion diffusion is performed through this mask aperture, and ion diffusion is discontinued at a point of time when the diffusion front has reached apexes A, B, C and D, the diffusion front 5 assumes a shape shown by dotted lines in the figure, with reduced rounded areas on the diffusion region.

Even with this shape of mask apertures, the corners of the diffusion fronts are rounded at the apexes of the mask apertures. To cope with these unwantedly rounded diffusion fronts, the apex parts of mask apertures may be chamfered or rounded in advance.

Figure 20B:
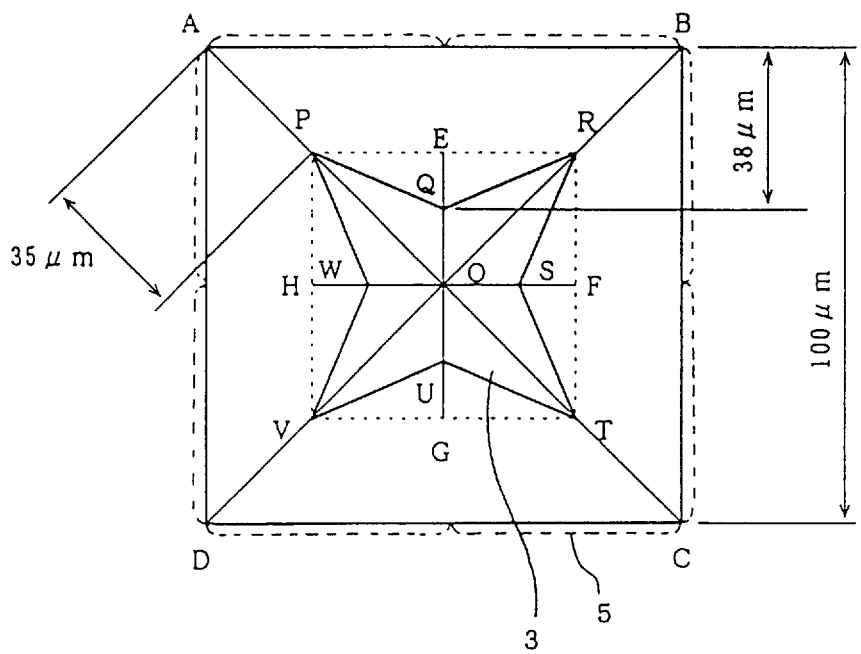

Since mask apertures are manufactured with photolithography, it is difficult to manufacture mask apertures of an extremely complex curved shape. Taking into account manufacturing accuracy and cost, therefore, points P, R, T and V in FIG. 20A may be connected by straight lines, instead of curves, as shown in FIG. 20B.

(Preferred Embodiment 5)

This embodiment is intended to modify the shape of mask apertures.

FIG. 21A shows a modified mask aperture shape. When the circumferential shape of a hexagonal microlens is expressed by six apexes A, B, C, D, E and F, and a central point O, the mask aperture for the microlens has a shape (star shape) expressed by a curve connecting the following points P, Q, R, S, T, U, V, W, X, Y, Z, M and P in that order.

Point P; A point on a segment AO at which distance $L_{AP}$ from point A is such that $0.25L_{AO} \leq L_{AP} \leq 0.67L_{AO}$.

Point R; A point on a segment BO at which distance $L_{BR}$ from point B is such that $0.25L_{BO} \leq L_{BR} \leq 0.67L_{BO}$.

Point T; A point on a segment CO at which distance $L_{CT}$ from point C is such that $0.25L_{CO} \leq L_{CT} \leq 0.67L_{CO}$.

Point V; A point on a segment DO at which distance $L_{DV}$ from point D is such that $L_{DV}=L_{AP}$.

Point X; A point on a segment EO at which distance $L_{EX}$ from point E is such that $L_{EX}=L_{BR}$.

Point Z; A point on a segment FO at which distance $L_{FZ}$ from point F is such that $L_{FZ}=L_{CT}$.

Point Q; A point obtained by shifting point E, the bisecting point of segment PR, in the direction of point O by $L_{EQ}$ where $0<L_{EQ} \leq 0.5L_{EO}$.

Point S; A point obtained by shifting point F, the bisecting point of segment RT, in the direction of point O by $L_{FS}$ where $0<L_{FS} \leq 0.5L_{FO}$.

Point U; A point obtained by shifting point G, the bisecting point of segment TV, in the direction of point O by $L_{GU}$ where $0<L_{GU}\leq 0.5L_{GO}$.

Point W; A point obtained by shifting point H, the bisecting point of segment VX, in the direction of point O by $L_{HW}$ where $L_{HW}=L_{EQ}$.

Point Y; A point obtained by shifting point I, the bisecting point of segment XZ, in the direction of point O by $L_{IY}$ where $L_{IY}=L_{FS}$.

Point M; A point obtained by shifting point J, the bisecting point of segment ZP, in the direction of point O by $L_{JM}$ where $L_{JM}=L_{GU}$.

When $L_{AP}$, $L_{BR}$ and $L_{CT}$ are smaller than $0.25L_{AO}$, $0.25L_{BO}$ and $0.25L_{CO}$, respectively, it is difficult to form a lens having good lens action. When $L_{AP}$, $L_{BR}$ and $L_{CT}$ are larger than $0.67L_{AO}$, $0.67L_{BO}$ and $0.67L_{CO}$, the mask aperture becomes smaller, the adverse effects of point diffusion could result. When $L_{EQ}$, $L_{FS}$ and $L_{GU}$ are larger than $0.5L_{EO}$, $0.5L_{FO}$ and $0.5L_{GO}$, respectively, the adverse effects of point diffusion could also result.

By using mask apertures of such a shape, the rounding of the diffusion fronts 5 can be substantially reduced, as shown in the figure.

Since mask apertures are manufactured with photolithography, it is difficult to manufacture mask apertures of an extremely complex curved shape. Taking into account manufacturing accuracy and cost, therefore, points P, R, T, V, X and Z in FIG. 21A may be connected by straight lines, instead of curves, as shown in FIG. 21B.

Further modified embodiment of FIGS. 20B and 21B will be described in the following. In the modified embodiments, the adjoining apexes of a second polygon are connected with three broken lines, rather than two broken line in the above-mentioned embodiment.

Figure 22A:
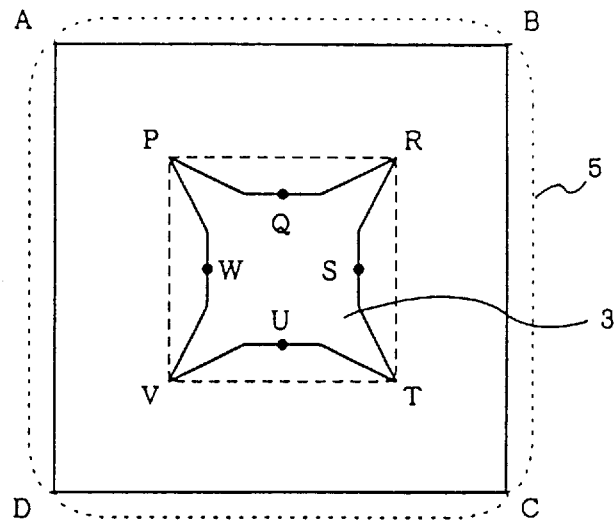
FIGS. 22A and 22B are diagrams illustrating still another embodiment of the planar microlens array according to the present invention.
Figure 22B:
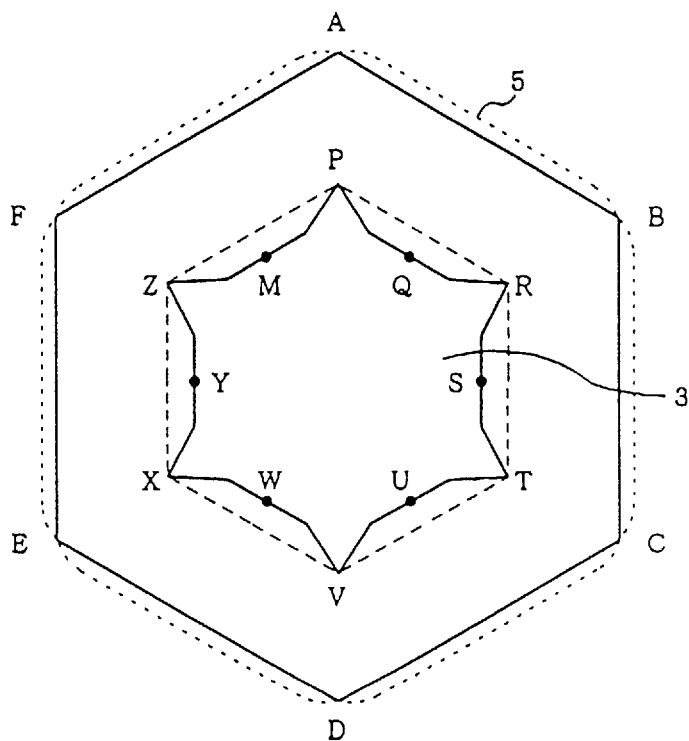

FIG. 22A shows a mask aperture of a square shape, and FIG. 22B shows a mask aperture of a hexagonal shape. Points Q, S, U and W in FIG. 22A correspond to points Q, S, U and W in FIG. 20B, while points M, Q, S, U, W, Y and M in FIG. 22B correspond to points M, Q, S, U, W, Y and M in FIG. 21B.

(Preferred Embodiment 6)

A planar microlens array according to the present invention applied to an image display device will be described.

The basic construction of an image display device 8 is similar to that shown in FIG. 5. In this embodiment, microlenses 84 constituting a planar microlens array 82 are arranged at positions corresponding to pixels on a liquid-crystal display panel 81. The circumferential shape of the microlenses 84 may be assumed to be equal to the shape of pixels on the liquid-crystal display panel 81. The shape of mask apertures may also be assumed to be a shape enclosed by lines that are parallel with the outer periphery of the pixel shape and have a predetermined distance d from the outer periphery, and disposed within the pixel shape of the liquid-crystal display panel 81.

In terms of specific numeral values, pixels of an approximately 100 μm×100 μm square shape with pixel aperture regions of a 55 μm×55 μm square shape were used. The array type was a four-lobe array (refer to FIG. 14.)

Two types of image display devices were manufactured using as the planar microlens array 82 planar microlens arrays according to the above Embodiments 1 and 2 with mask apertures of a 100 μm×100 μm square, d=20 μm. The image display device 8 was assembled by aligning the focal points of the lenses 84 of the planar microlens array 82 with the centers of the pixel aperture regions 81b of the liquid-crystal display panel 81.

The results of evaluation of the amount of light reaching the screen 88 in this device revealed that 67% of the amount of incident light was converged within the pixel aperture region 81b in the image display device 8 using the planar microlens array 82 of Embodiment 1. The amount of light falling on the screen 88 in this case was approximately 1.3 times brighter, compared with the device using a four-lobe planar microlens array manufactured with conventional circular mask apertures.

In the image display device 8 using the planar microlens array 82 of Embodiment 2, too, 73% of incident light was converged within the pixel aperture region 81b. The amount of light falling on the screen 88 was approximately 1.4 times brighter, compared with the device using a four-lobe planar microlens array manufactured with conventional circular mask apertures.

Although the planar microlens arrays of Embodiments 1 and 2 were used in this embodiment, the same effects can be achieved with the planar microlens array of Embodiment 4.

Although Koehler illumination was employed in the above image display devices using the planar microlens arrays, the present invention can be applied to other illumination methods, including the telecentric illumination.

In the image display device using the planar microlens array according to the present invention, three liquid-crystal display panels can be used to display images of three primary colors and obtain color images by optically synthesizing those 3-primary-color images. The display panel may not be limited to the liquid-crystal display panel, but may be any transmission type display panel.

Although description was omitted in the image display device shown in FIG. 5, when a liquid-crystal display panel of the twist nematic mode is used, it is necessary to provide a polarizer on the light-source side and an analyzer on the screen side of the liquid-crystal display panel.

(Preferred Embodiment 7)

Figure 23:
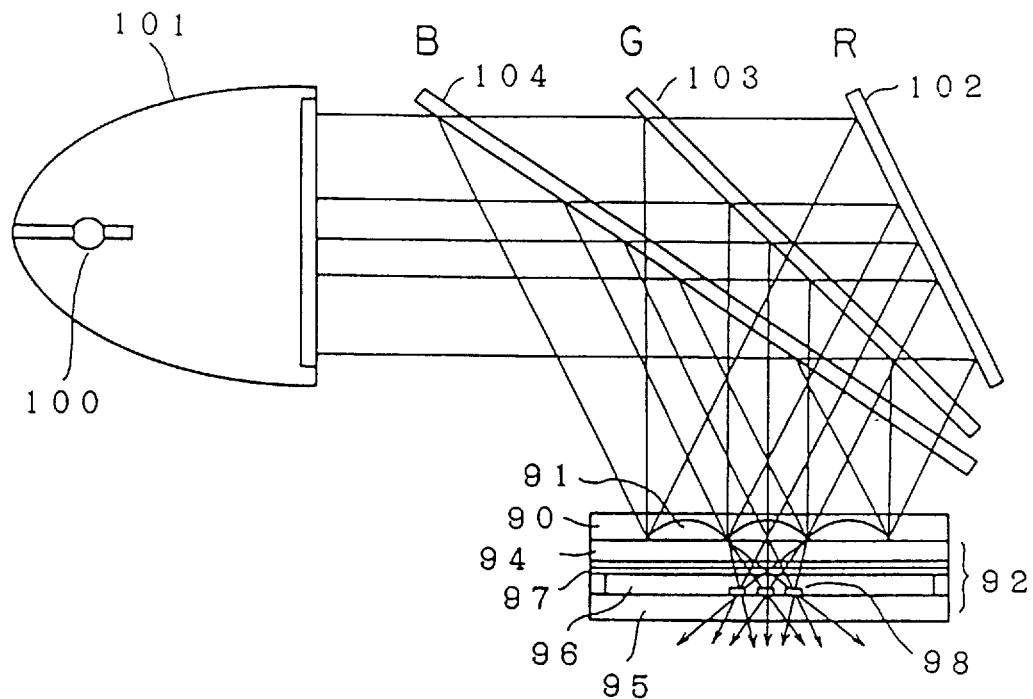
FIG. 23 is a block diagram illustrating an example where a planar microlens array according to the present invention is applied to an image display device.

FIG. 23 is a block diagram illustrating an embodiment where the planar microlens array of Embodiments 1 and 2 were applied to the image display device.

In this embodiment, microlenses 91 constituting the planar microlens array 90 are disposed in such a manner that one microlens covers three pixels corresponding to red, green and blue (hereinafter referred to as R, G and B) of the liquid-crystal display panel 92. In the liquid-crystal display panel 92, numerals 94 and 95 denote glass substrates, 96 a liquid-crystal layer, 97 a scanning electrode and 98 a signal electrode.

The light emitted from a light source 100 is converted into almost parallel light with a parabolic mirror 101, and cast upon three types of dichroic mirrors (R) 102, (G) 103 and (B) 104 as color separating means. The dichroic mirrors selectively reflect wavelengths of R, G and B, respectively, of light while allowing others to pass through, and are disposed on the optical axis in that order. In this embodiment, each of the dichroic mirrors is inclined from its original position that is parallel with each other by a few degrees around the rotational axis that is vertical to the paper surface so that the incident angle of light from the light source 100 upon the dichroic mirrors 103 is kept at about 45°. The angle formed by each dichroic mirror can be calculated from the pixel array pitch P of the liquid-crystal display panel 92, which will be described later, and the focal length f of the microlens 91 of the planar microlens array 90. By arranging the dichroic mirrors 102, 103 and 104 in this manner, the white light from the light source 100 is separated into three colors of R, G and B, and cast upon the microlenses 91 disposed behind the dichroic mirrors 102, 103 and 104 at angles different from each other. It should be noted that the incident angle of the white light upon the dichroic mirrors R, G and B need not necessarily be 45°.

Figure 24:
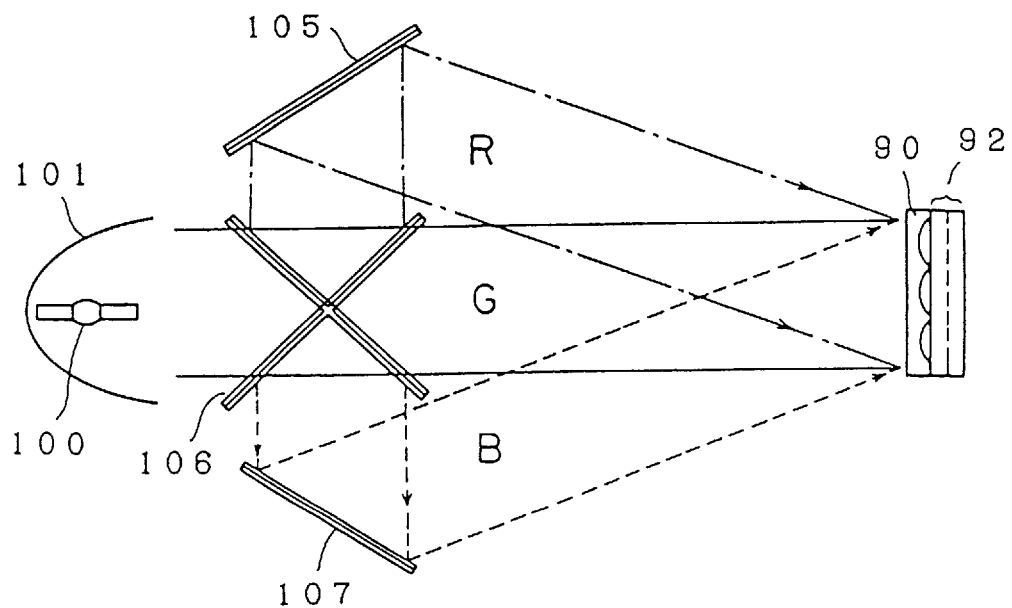
FIG. 24 is a diagram illustrating another layout of a dichroic mirror.

Color separating means may be of any type so long as it has the same action as the above-mentioned dichroic mirror. Dichroic mirrors 105, 106 and 107, for example, may be arranged as shown in FIG. 24.

When the difference θ in the incident angle of three-color light fluxes falling on the microlens 91 is selected so that tanθ=P/f, the converged light spots of three-color fluxes can be cast upon the pixel apertures corresponding to R, G and B, respectively, as shown in FIG. 25.

In this embodiment, an active-matrix type liquid-crystal display panel of a 120 μm×120 μm pixel pitch was used as the liquid-crystal display panel 92. The microlens 91 was set to be almost equal to the thickness t=1.1 mm of the glass substrates 94 and 95 of the liquid-crystal display panel. In this case, the focal length of the microlens as measured in the atmosphere was t/n=1.1/1.53=0.72 mm where n is the refractive index of the glass substrates 94 and 95 of the liquid-crystal display panel 92.

The dichroic mirrors were set so that the difference θ in the incident angles of the light of three colors incident upon the microlenses is such that $\theta=\tan^{-1}120/720=9.5°$.

The results of evaluation of the amount of light reaching the screen with the above construction indicate that the amount of light incident on the screen of the image display device using the planar microlens array manufactured in the same manner as Embodiment 2 (whose array pitch was different from that of Embodiment 2) was approximately 1.4 times brighter than that using a conventional planar microlens array with circular mask apertures, and the improved aberration of the microlenses led to less color mixing (where light of each color is incident upon the pixel adjoining to the pixel upon which it would originally fall) that has frequently occurred due to the aberration of the microlenses. Thus, the purity of color has been improved as shown in FIG. 26. FIG. 26 is the chromaticity diagram introduced by CIE (Commission Internationale de l'Eclairage) in which R, G and B represent standard chromaticity of NTSC (National Television System Committee). FIG. 26 also shows the chromaticity for an image display device using a conventional microlens array of circular mask apertures for comparison.

When a planar microlens array manufactured in the same manner as with Embodiment 1 (whose array pitch is different from that of Embodiment 1) was used, the amount of light incident upon the screen was approximately 1.3 times brighter than that with a conventional microlens array, and color purity was also substantially improved.

In this embodiment, the planar microlens arrays of Embodiments 1 and 2 were used, but the same effects can of course be obtained by using the planar microlens array of Embodiment 4.

Industrial Applicability

As described above, the present invention makes it possible to realize a planar microlens array with high converging efficiency regardless of the array types thereof.

The method of manufacturing planar microlens arrays according to the present invention makes it possible to accomplish a planar microlens array with the lens filling rate of almost 100% and smaller overlapped diffusion regions, that is, with high lens effective area ratio.

Furthermore, with an image display device combining a planar microlens array according to the present invention with a plurality of pixels, the amount of light reaching the screen can be increased because high converging efficiency can be realized regardless of pixel arrays of the display panel. Thus, an extremely bright image display device can be accomplished.

We claim:

1. A method of manufacturing a planar microlens array having a multitude of refractive-index distribution type microlenses of a polygonal circumferential shape arranged two-dimensionally and periodically on the surface of a planar transparent substrate, characterized in that said method includes the steps of:

preparing a planar transparent substrate, forming on the surface of said substrate a diffusion-inhibiting mask film having a multitude of periodically arranged mask apertures of a shape enclosed by straight lines that are parallel with and disposed at a predetermined interval inwardly away from sides of said polygonal circumferential shape, and forming microlenses over the almost entire surface of said substrate by diffusing in said substrate a substance contributing to increasing the refractive index of said substrate through said mask apertures.

2. A method of manufacturing a planar microlens array having a multitude of refractive-index distribution type microlenses of a polygonal circumferential shape arranged two-dimensionally and periodically on the surface of a planar transparent substrate, characterized in that said method includes the steps of:

preparing a planar transparent substrate, forming on the surface of said substrate a diffusion-inhibiting mask film having a multitude of periodically arranged mask apertures of a shape connecting curves or broken lines passing inside straight lines that are parallel with and disposed at a predetermined interval inwardly away from sides of said polygonal circumferential shape, and forming microlenses over the almost entire surface of said substrate by diffusing in said substrate a material contributing to increasing the refractive index of said substrate through said mask apertures.

3. A method of manufacturing a planar microlens array as set forth in claim 1 or 2, wherein said substance contributing to increasing the refractive index of said substrate is diffused with the ion diffusion process or the diffusion copolymerization process, diffusion time or copolymerization time is controlled so that said microlenses are densely arranged on the surface of said substrate, diffusion fronts of said microlenses form regions where said diffusion fronts are fused with diffusion regions of adjoining microlenses, and then length, in the direction of a straight line connecting centers of adjoining two microlenses, of said regions where said two microlenses are fused together becoming less than 20% of an array pitch of said microlenses in said direction.

4. A method of manufacturing a planar microlens array as set forth in claim 3, wherein the shape of said mask apertures is a square, hexagon, or star shape.

5. A method of manufacturing a planar microlens array as set forth in claim 1 or 2, wherein when said substance contributing to increasing the refractive index of said substrate is diffused with the ion diffusion process or the diffusion copolymerization process, diffusion time or copolymerization time is controlled so that said microlenses are densely arranged on the surface of said substrate, and diffusion fronts of said microlenses come in contact in a linear form with, but are not fused with, diffusion fronts of adjoining microlenses.

6. A method of manufacturing a planar microlens array as set forth in claim 5, wherein the shape of said mask apertures is a square, hexagon or star shape.

7. A method of manufacturing a planar microlens array as set forth in claim 2, wherein the array of said mask apertures is a four-lobe array, said polygonal circumferential shape is a rectangle; when said rectangle is expressed by four apexes A, B, C, and D, and an intersecting point O of diagonal lines AC and BD, each of said mask apertures has a shape expressed by straight lines connecting the following points P, Q, R, S, T, U, V, W and P in that order, Point P; a point on line segment AO at which distance $L_{AP}$ from point A is such that $0.25 L_{AO} \leq L_{AP} \leq 0.67 L_{AO}$, Point R; a point on line segment BO at which distance $L_{BR}$ from point B is such that $L_{BR} = L_{AP}$, Point T; a point on line segment CO at which distance $L_{CT}$ from point C is such that $L_{CT} = L_{AP}$, Point V; a point on line segment DO at which distance $L_{DV}$ from point D is such that $L_{DV} = L_{AP}$, Point Q; a point obtained by shifting point E, the bisecting point of line segment PR, by $L_{EQ}$, in the direction of point O where $0 < L_{EQ} \leq 0.67 L_{EQ}$, Point S; a point obtained by shifting point F, the bisecting point of line segment RT, by $L_{FS}$, in the direction of point O where $0 < L_{FS} \leq 0.67 L_{FO}$, Point U; a point obtained by shifting point G, the bisecting point of line segment TV, by $L_{GU}$, in the direction of point O where $L_{GU} = L_{EQ}$, and Point W; a point obtained by shifting point H, the bisecting point of line segment VP, by $L_{XW}$, in the direction of point O where $L_{HW} = L_{FS}$.

8. A method of manufacturing a planar microlens array as set forth in claim 7, wherein when the array of said mask-aperture is a four-lobe array, said rectangle is a square and $L_{EQ} = L_{FS}$.

9. A method of manufacturing a planar microlens array as set forth in claim 2, wherein the array of said mask apertures is a four-lobe array, said polygonal circumferential shape is a rectangle; when said rectangle is expressed by four apexes A, B, C, and D, and an intersecting point O of diagonals AC and BD, each of said mask apertures has a shape enclosed by a curve connecting PQR, a curve connecting RST, a curve connecting TUV and a curve connecting VWP among the following points P, Q, R, S, T, U, V, and W, Point P; a point on line segment AO at which distance $L_{AP}$ from point A is such that $0.25\ L_{AO} \leq L_{AP} \leq 0.67\ L_{AO}$, Point R; a point on line segment BO at which distance $L_{BR}$ from point B is such that $L_{BR} = L_{AP}$, Point T; a point on line segment CO at which distance $L_{CT}$ from point C is such that $L_{CT} = L_{AP}$, Point V; a point on line segment DO at which distance $L_{DV}$ from point D is such that $L_{DV} = L_{AP}$, Point Q; a point obtained by shifting point E, the bisecting point of line segment PR, by $L_{EQ}$, in the direction of point O where $0 < L_{EQ} \leq 0.67 L_{EQ}$, Point S; a point obtained by shifting point F, the bisecting point of line segment RT, by $L_{FS}$, in the direction of point O where $0 < L_{FS} \leq 0.67 L_{FO}$, Point U; a point obtained by shifting point G, the bisecting point of line segment TV, by $L_{GU}$, in the direction of point O where $L_{GU} = L_{EQ}$, and Point W; a point obtained by shifting point H, the bisecting point of line segment VX, by $L_{HW}$, in the direction of point O where $L_{HW} = L_{FS}$.

10. A method of manufacturing a planar microlens array as set forth in claim 9, wherein said rectangle is a square and $L_{EQ} = L_{FS}$.

11. A method of manufacturing a planar microlens array as set forth in claim 2, wherein the array of said mask apertures is a sex-lobe array, said polygonal circumferential shape is a regular hexagonal; when said regular hexagonal is expressed by six apexes A, B, C, D, E, and F, and a central point, each of said mask apertures has a shape expressed by straight lines connecting the following points P, Q, R, S, T, U, V, W, X, Y, Z, M, and P in that order, Point P; a point on line segment AO at which distance $L_{AP}$ from point A is such that $0.25 L_{AO} \leq L_{AP} \leq 0.67\ L_{AO}$, Point R; a point on line segment BO at which distance $L_{BR}$ from point B is such that $0.25\ L_{BO} \leq L_{BR} \leq 0.67\ L_{BO}$, Point T; a point on line segment CO at which distance $L_{CT}$ from point C is such that $0.25\ L_{CO} \leq L_{CT} \leq 0.67\ L_{CO}$, Point V; a point on line segment DO at which distance $L_{DV}$ from point D is such that $L_{DV} = L_{AP}$, Point X; a point on line segment EO at which distance $L_{EX}$ from point E is such that $L_{EX} = L_{BR}$, Point Z; a point on line segment FO at which distance $L_{FZ}$ from point F is such that $L_{FZ} = L_{CT}$, Point Q; a point obtained by shifting point E, the bisecting point of line segment PR, by $L_{EQ}$, in the direction of point O where $0 < L_{EQ} \leq 0.5\ L_{EQ}$, Point S; a point obtained by shifting point F, the bisecting point of line segment RT, by $L_{FS}$, in the direction of point O where $0 < L_{FS} \leq 0.5\ L_{FO}$, Point U; a point obtained by shifting point G, the bisecting point of line segment TV, by $L_{GU}$, in the direction of point O where $0 < L_{GU} \leq 0.5\ L_{GO}$, Point W; a point obtained by shifting point H, the bisecting point of line segment VX, by $L_{HW}$, in the direction of point O where $L_{HW} = L_{EQ}$, Point Y; a point obtained by shifting point I, the bisecting point of line segment XZ, by $L_{IY}$, in the direction of point O where $L_{IY} = L_{FS}$, and Point M; a point obtained by shifting point J, the bisecting point of line segment ZP, by $L_{JM}$, in the direction of point O where $L_{JM} = L_{GU}$.

12. A method of manufacturing a planar microlens array as set forth in claim 2, wherein the array of said mask apertures is a sex-lobe array, said polygonal circumferential shape is a regular hexagonal; when said regular hexagonal is expressed by six apexes A, B, C, D, E, and F, and O, each of said mask apertures has a shape enclosed by a curve connecting PQR, a curve connecting RST, a curve connecting TUV, a curve connecting VWX, a curve connecting XYZ, and a curve connecting ZMP from among the following points of P, Q, R, S, T, U, V, W, X, Y, Z, and M, Point P; a point on line segment AO at which distance $L_{AP}$ from point A is such that $0.25\ L_{AO} \leq L_{AP} \leq 0.67\ L_{AO}$, Point R; a point on line segment BO at which distance $L_{BR}$ from point B is such that $0.25\ L_{BO} \leq L_{BR} \leq 0.67\ L_{BO}$, Point T; a point on line segment CO at which distance $L_{CT}$ from point C is such that $0.25\ L_{CO} \leq L_{CT} \leq 0.67\ L_{CO}$, Point V; a point on line segment DO at which distance $L_{DV}$ from point D is such that $L_{DV} = L_{AP}$, Point X; a point on line segment EO at which distance $L_{EX}$ from point E is such that $L_{EX} = L_{BR}$, Point Z; a point on line segment FO at which distance $L_{FZ}$ from point F is such that $L_{FZ} = L_{CT}$, Point Q; a point obtained by shifting point E, the bisecting point of line segment PR, by $L_{EQ}$, in the direction of point O where $0 < L_{EQ} \leq 0.5\ L_{EQ}$, Point S; a point obtained by shifting point F, the bisecting point of line segment RT, by $L_{FS}$, in the direction of point O where $0<L_{FS}\leq 0.5\ L_{FO}$, Point U; a point obtained by shifting point G, the bisecting point of line segment TV, by $L_{GU}$, in the direction of point O where $0<L_{GU}\leq 0.5\ L_{GO}$, Point W; a point obtained by shifting point H, the bisecting point of line segment VX, by $L_{HW}$, in the direction of point O where $L_{HW}=L_{EQ}$, Point Y; a point obtained by shifting point I, the bisecting point of line segment XZ, by $L_{IY}$, in the direction of point O where $L_{IY}=L_{FS}$, and Point M; a point obtained by shifting point J, the bisecting point of line segment ZP, by $L_{JM}$, in the direction of point O where $L_{JM}=L_{GU}$.

13. A method of manufacturing a planar microlens array as set forth in any one of claims 7 through 10, wherein the ratio of area occupied by said microlenses to the area of said substrate is more than 80% in the case where the circumferential shape of said mask apertures is a square, and more than 91% in the case where the aspect ratio of said microlenses is less than 2.

14. A method of manufacturing a planar microlens array having a multitude of refractive-index distribution type microlenses arranged two-dimensionally and periodically on the surface of a planar transparent substrate, characterized in that said method includes the steps of:

preparing a planar transparent substrate, forming a diffusion-inhibiting mask film having a multitude of two-dimensionally and periodically arranged mask apertures on the surface of said substrate, and forming microlenses on the surface of said substrate by diffusing in said substrate a substance contributing to increasing the refractive index of said substrate through said mask apertures, in such a manner that said microlenses are densely arranged on the surface of said substrate, diffusion fronts of said microlenses form regions where said diffusion fronts are fused with diffusion regions of adjoining microlenses, and the length, in the direction of a straight line connecting centers of adjoining two microlenses, of said regions where said two microlenses are fused together becoming less than 20% of an array pitch of said microlenses in said direction.

15. A method of manufacturing a planar microlens array having a multitude of refractive-index distribution type microlenses arranged two-dimensionally and periodically on the surface of a planar transparent substrate, characterized in that said method includes the steps of:

preparing a planar transparent substrate, forming a diffusion-inhibiting mask film having a multitude of two-dimensionally and periodically arranged mask apertures on the surface of said substrate, and forming microlenses on the surface of said substrate by diffusing in said substrate a substance contributing to increasing the refractive index of said substrate through said mask, in such a manner that said microlenses are densely arranged on the surface of said substrate, and diffusion fronts of said microlenses come in contact in a linear form with, but are not fused with, diffusion fronts of adjoining microlenses.

16. A method of manufacturing a planar microlens array as set forth in claim 14 or 15, wherein the circumferential shape of said microlenses is a polygon, the array of said microlenses being a four-lobe or six-lobe array.

17. A method of manufacturing a planar microlens array as set forth in claim 16, wherein said polygon is a rectangle or hexagon.

18. A method of manufacturing a planar microlens array having a multitude of refractive-index distribution type microlenses arranged two-dimensionally and periodically on the surface of a planar transparent substrate, characterized in that said method includes the steps of:

preparing a planar transparent substrate, forming a diffusion inhibiting mask film having a multitude of two-dimensionally and periodically arranged mask apertures on the surface of said substrate, and forming microlenses of a polygonal circumferential shape over the almost entire surface of said substrate by diffusing in said substrate a substance contributing to increasing the refractive index of said substrate through said mask apertures, and wherein the shape of said mask apertures is set in said diffusion-inhibiting mask film forming step so that diffusion fronts corresponding to the sides of the microlenses being formed become linear.

\* \* \* \* \*